United States Patent
Horner

(10) Patent No.: US 10,024,957 B2
(45) Date of Patent: Jul. 17, 2018

(54) ADAPTIVE BEAMFORMER FOR SONAR IMAGING

(71) Applicant: NAVICO HOLDING AS, Egersund (NO)

(72) Inventor: Ronald Joe Horner, Collinsville, OK (US)

(73) Assignee: NAVICO HOLDING AS, Egersund (NO)

(*) Notice: Subject to any disclaimer, the term of this patent is extended or adjusted under 35 U.S.C. 154(b) by 509 days.

(21) Appl. No.: 14/857,337

(22) Filed: Sep. 17, 2015

(65) Prior Publication Data
US 2017/0082739 A1    Mar. 23, 2017

(51) Int. Cl.
*G01S 7/521* (2006.01)
*G01S 7/62* (2006.01)
*G01S 15/89* (2006.01)
*G01S 7/52* (2006.01)
*G01S 7/526* (2006.01)

(52) U.S. Cl.
CPC .......... *G01S 7/521* (2013.01); *G01S 7/52003* (2013.01); *G01S 7/526* (2013.01); *G01S 7/6245* (2013.01); *G01S 15/89* (2013.01); *G10K 2200/10* (2013.01)

(58) Field of Classification Search
CPC ...... G01S 7/521; G01S 15/89; G01S 7/52003; G01S 7/526; G01S 7/6245; G10K 2200/10
See application file for complete search history.

(56) References Cited

U.S. PATENT DOCUMENTS

| | | |
|---|---|---|
| 3,311,871 A | 3/1967 | Sidney |
| 3,436,721 A | 4/1969 | Farr |
| 4,244,026 A | 1/1981 | Dickey, Jr. |

(Continued)

FOREIGN PATENT DOCUMENTS

| | | |
|---|---|---|
| WO | WO 2007/025572 A1 | 3/2007 |
| WO | WO 2008/105932 A2 | 9/2008 |
| WO | WO 2010/100868 A1 | 9/2010 |

OTHER PUBLICATIONS

U.S. Appl. No. 14/717,458, filed May 20, 2015; In re: Horner; entitled *Sonar Systems and Methods Using Interferometry and/or Beamforming for 3D Imaging.*

(Continued)

*Primary Examiner* — Daniel Pihulic
(74) *Attorney, Agent, or Firm* — Nelson Mullins Riley & Scarborough LLP

(57) ABSTRACT

Provided are method, system, and computer program product for imaging an underwater environment. The method may include receiving sonar returns and converting the sound energy of the sonar returns into sonar return data, and generating first beam data associated with a first beam having at least one first main lobe oriented in a first direction. Generating the first beam data may include: forming the sonar return data in the first direction; applying a first predetermined window to the sonar return data to define a first weighted return data; applying a second predetermined window to the sonar return data to define a second weighted return data; comparing a first power of the first weighted return data to a second power of the second weighted return data; and defining, when the first power is less than the second power, the first beam data based upon the first weighted return data.

50 Claims, 25 Drawing Sheets

(56) References Cited

U.S. PATENT DOCUMENTS

| | | | |
|---|---|---|---|
| 4,879,697 A | | 11/1989 | Lowrance et al. |
| 4,965,776 A | * | 10/1990 | Mueller .................... G01S 3/86 367/123 |
| 5,025,423 A | | 6/1991 | Earp |
| 5,050,133 A | | 9/1991 | Buddery |
| 5,103,129 A | | 4/1992 | Slayton et al. |
| 5,184,330 A | | 2/1993 | Adams et al. |
| 5,235,857 A | * | 8/1993 | Anderson ............. G01S 7/6245 73/625 |
| 5,305,286 A | * | 4/1994 | Woodsum ............... G01S 15/00 367/92 |
| 5,532,700 A | * | 7/1996 | Lockwood .......... G01S 7/52003 342/378 |
| 6,058,075 A | * | 5/2000 | Bourdelais .......... G01S 7/52003 367/103 |
| 6,120,450 A | | 9/2000 | Li |
| 6,130,641 A | | 10/2000 | Kraeutner et al. |
| 6,201,767 B1 | | 3/2001 | Lagace et al. |
| 6,285,628 B1 | | 9/2001 | Kiesel |
| 6,438,071 B1 | | 8/2002 | Hansen et al. |
| 7,307,914 B1 | * | 12/2007 | Carter .................... G01S 11/14 367/118 |
| 8,300,499 B2 | | 10/2012 | Coleman et al. |
| 8,305,840 B2 | | 11/2012 | Maguire |
| 8,605,550 B2 | | 12/2013 | Maguire |
| 8,717,847 B2 | | 5/2014 | Blake |
| 9,664,783 B2 | | 5/2017 | Brown et al. |
| 9,766,328 B2 | | 9/2017 | Black et al. |
| 9,784,825 B2 | | 10/2017 | Brown et al. |
| 9,784,826 B2 | | 10/2017 | Matson et al. |
| 9,812,118 B2 | | 11/2017 | Matson et al. |
| 2002/0035444 A1 | | 3/2002 | Wilkerson et al. |
| 2002/0167862 A1 | | 11/2002 | Tomasi et al. |
| 2003/0081503 A1 | | 5/2003 | Barnard et al. |
| 2003/0235112 A1 | | 12/2003 | Zimmerman et al. |
| 2004/0165479 A1 | | 8/2004 | Scoca et al. |
| 2005/0007880 A1 | | 1/2005 | Zimmeinian et al. |
| 2005/0099887 A1 | | 5/2005 | Zimmerman |
| 2005/0101867 A1 | | 5/2005 | Johnson et al. |
| 2005/0195103 A1 | | 9/2005 | Davis et al. |
| 2006/0013066 A1 | | 1/2006 | Nishimori et al. |
| 2007/0044559 A1 | | 3/2007 | Andrews |
| 2007/0285315 A1 | | 12/2007 | Davis et al. |
| 2010/0067822 A1 | | 3/2010 | Young |
| 2010/0080082 A1 | | 4/2010 | Betts et al. |
| 2010/0170617 A1 | | 7/2010 | Woods et al. |
| 2011/0013484 A1 | | 1/2011 | Coleman et al. |
| 2011/0013485 A1 | | 1/2011 | Maguire |
| 2012/0163126 A1 | | 6/2012 | Campbell et al. |
| 2012/0281507 A1 | | 11/2012 | Rikoski |
| 2013/0208568 A1 | | 8/2013 | Coleman |
| 2014/0010048 A1 | | 1/2014 | Proctor |
| 2014/0010049 A1 | | 1/2014 | Proctor |
| 2014/0269163 A1 | | 9/2014 | Proctor |
| 2014/0269192 A1 | | 9/2014 | Proctor |
| 2015/0369908 A1 | | 12/2015 | Zimmerman et al. |
| 2016/0232884 A1 | | 8/2016 | Parks |
| 2016/0259049 A1 | | 9/2016 | Proctor et al. |
| 2016/0259053 A1 | | 9/2016 | Proctor et al. |
| 2016/0341827 A1 | | 11/2016 | Homer et al. |
| 2017/0082739 A1 | * | 3/2017 | Horner .................... G01S 7/521 |
| 2017/0123062 A1 | | 5/2017 | Coleman et al. |
| 2017/0212230 A1 | | 7/2017 | Wigh et al. |

OTHER PUBLICATIONS

IEEE Xplore Abstract—A low-complexity data-dependent beamformer [online] [retrieved Nov. 12, 2015]. Retrieved from the Internet: <URL: http://ieeexplore.ieee.org/xpl/freeabs_all.jsp?arnumber=5716445&abstractAccess-no&us . . . > (Feb. 2011) 2 pages.

IEEE Xplore Abstract—Improving Sonar Performance in Shallow Water Using Adaptive . . . [online] [retrieved Nov. 12, 2015]. Retrieved from the Internet: <URL: http://ieeexplore.ieee.org/xpl/articleDetails.jsp?reload=true&arnumber=6401207>. (Apr. 2013) 2 pages.

U.S. Appl. No. 62/128,635, filed Mar. 5, 2015, In re: Kirmani entitled *Systems and Associated Methods for Producing a 3D Sonar Image*.

U.S. Appl. No. 62/128,641, filed Mar. 5, 2015, In re: Kirmani entitled *Methods and Apparatuses for Reconstructing a 3D Sonar Image*.

*ITC Applicatons Equations for Underwater Sound Transducers*, Published by International Transducer Corporation, 1995, Rev. 8/00; 3 pages.

U.S. Appl. No. 14/717,458, filed May 20, 2015; In re: Horner et al.; entitled *Sonar Systems and methods Using Interferometry and/or Beamforming for 3D Imaging*.

Extended European Search Report for European Application No. EP16189168.4 dated Jan. 31, 2017.

Synnevag et al., "A low complexity data-dependent beamformer:", Ultrasonics Symposium 2008, Nov. 2, 2008, pp. 1084-1087.

Synnevag et al., "A low complexity data-dependent beamformer:", IEEE Transactions on Ultrasonics Ferroelectrics and Frequency Control, vol. 58, No. 2, Feb. 1, 2011, pp. 281-289.

Blomberg et al., "Improving Sonar Performance in Shallow Water Using Adaptive Beamforming", IEEE Journal of Oceanic Engineering, vol. 38, No. 2, Apr. 1, 2013, pp. 297-307.

European Search Report for European Application No. EP16170460.6 dated Sep. 23, 2016.

Kraeutner et al.; Rethinking Forward-Looking Sonar for AUV'S: Combining Horizontal Beamforming with Vertical Angle-of-Arrival Estimation; Teledyne RD Instruments; Sep. 4, 2008.

Sărăcin et al.; "Interferometric Bathymetry—principles and utility"; Oct. 8, 2013; 1st European Conference of Geodesy and Geomatics Engineering; pp. 198-205.

International Search Report and Written Opinion for International Application No. PCT/US2013/048177 dated Oct. 21, 2013.

International Search Report and Written Opinion for International Application No. PCT/US2013/048129 dated Oct. 17, 2013.

Llort-Pujol et al.; *Advanced interferometric techniques for high-resolution bathymetry*; Journal of Marine Technology Society; Mar. 1, 2012; vol. 46, No. 2; pp. 1-27.

\* cited by examiner

ADAPTIVE BEAMFORMER FOR SONAR IMAGING

FIELD OF THE INVENTION

Embodiments of the present invention relate generally to sonar systems and, more particularly, to sonar systems, assemblies, and associated methods that use adaptive beamforming for producing one or more sonar images of an underwater environment.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar returns can also be processed to be displayed in graphical form on a display device, giving the user a "picture" or image of the underwater environment. The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Traditionally, sonar systems transmit sonar returns into an underwater environment and receive sonar returns that are reflected off objects in the underwater environment (e.g., fish, structure, sea floor bottom, etc.).

Applicant has identified a number of further deficiencies and problems associated with conventional sonar systems and other associated systems. Through applied effort, ingenuity, and innovation, many of these identified problems have been solved by developing solutions that are included in embodiments of the present invention, many examples of which are described in detail herein.

BRIEF SUMMARY OF THE INVENTION

A sonar system may image different areas (or volumes) of an underwater environment simultaneously using a technique known as beamforming. During beamforming, the sonar returns are formed into a plurality of differently-angled beams to produce images of the underwater environment.

Sonar systems operate in a dynamic environment, with continuously changing returns and noise being received by the sonar transducer elements. During beamforming, the sonar system attempts to process returns from a desired direction (e.g., a primary direction of the beam); however, reflections and other acoustic returns may be received by the transducer elements from other directions. These unwanted returns, or "interferers", may negatively impact the performance and sensitivity of the transducer array.

Traditionally adaptive sonar systems generate these beams using various algorithms that computationally determine and apply a determined shading window to produce a beam in the desired direction while reducing interference in other directions. For example, a Minimum Variance Distortionless Response (MVDR) beamformer estimates the sonar environment's covariance matrix to determine shading windows for each beam. However, these traditional algorithms and systems consume significant computational resources and may accidentally cancel desired sonar returns (e.g., own signal cancellation).

As detailed herein, sonar systems, transducer assemblies, and associated methods for imaging an underwater environment are provided. Some embodiments of a method may comprise receiving, via a transducer array, sonar returns from a sonar pulse transmitted into an underwater environment and may include converting the sound energy of the sonar returns into sonar return data. The transducer array may include at least two transducer elements. The method may further include generating, via a sonar signal processor, a first beam data associated with a first beam based on the sonar return data. The first beam may define at least one first main lobe oriented in a first direction. The generating step may include forming the sonar return data in the first direction. In some embodiments, the generating step may include applying a first predetermined window to the sonar return data to define first weighted return data. The first predetermined window may be configured to at least partially reduce the sonar return data outside the first direction in the first weighted return data. The generating step may include applying a second predetermined window to the sonar return data to define second weighted return data. The second predetermined window may be configured to at least partially reduce the sonar return data outside the first direction in the second weighted return data. Generating may include comparing a first power of the first weighted return data to a second power of the second weighted return data. In some embodiments, the generating step may include defining, in an instance in which the first power is less than the second power, the first beam data based upon the first weighted return data.

In some embodiments, the method may include generating a second beam data associated with a second beam based on the sonar return data. The second beam may define at least one second main lobe oriented in a second direction. Generating the second beam may include forming the sonar return data in the second direction. In some embodiments, generating the second beam may include applying a third predetermined window to the sonar return data to define a third weighted return data. The third predetermined window may be configured to at least partially reduce the sonar return data outside the second direction in the third weighted return data. Generating the second beam may include applying a fourth predetermined window to the sonar return data to define a fourth weighted return data. The fourth predetermined window may be configured to at least partially reduce the sonar return data outside the second direction in the fourth weighted return data. In some embodiments, generating the second beam may include comparing a third power of the third weighted return data to a fourth power of the fourth weighted return data. Generating the second beam may include defining, in an instance in which the third power is less than the fourth power, the second beam data based upon the third weighted return data.

In some embodiments of the method, the first predetermined window may be the same as the third predetermined window. In some other embodiments, the first predetermined window may be different from the third predetermined window.

In some embodiments of the method, the sonar return data may be formed in the first direction for the first beam data by applying a phase shift to the sonar returns received by one or more of the at least two transducer elements to align the sonar returns received by each of the at least two transducer elements in the first direction.

In some embodiments, the first predetermined window may define an average of a first plurality of predetermined windows. The first plurality of predetermined windows may include at least a fifth predetermined window and a sixth predetermined window. Generating the first beam data may further comprise applying the fifth predetermined window to the sonar return data to define a fifth weighted return data. The fifth predetermined window may be configured to at least partially reduce the sonar return data outside the first direction in the fifth weighted return data. In some embodiments, generating the first beam data may include applying the sixth predetermined window to the sonar return data to define a sixth weighted return data. The sixth predetermined window may be configured to at least partially reduce the sonar return data outside the first direction in the sixth weighted return data. Generating the first beam data may include comparing a fifth power of the fifth weighted return data to a sixth power of the sixth weighted return data. In some embodiments, in an instance in which the fifth power is less than the sixth power, defining the first beam data based upon the first weighted return data may further comprise defining the first beam data based upon the fifth weighted return data.

Comparing the fifth power of the fifth weighted return data to the sixth power of the sixth weighted return data may further comprise comparing the first power of the first weighted return data to the fifth power and the sixth power, such that in an instance in which the fifth power is less than the sixth power and the first power, the first beam data may be based upon the fifth weighted return data. The second predetermined window may define an average of a second plurality of predetermined windows. The first plurality of predetermined windows may comprise eight predetermined windows, including the fifth predetermined window and the sixth predetermined window. The second plurality of predetermined windows may comprise eight predetermined windows.

In some embodiments, the first main lobe may be symmetric about the first direction. The first main lobe may be offset from the first direction. In some embodiments, the first predetermined window may comprise unit gain in the first direction. In some embodiments, the second predetermined window may comprise unit gain in the first direction. The first beam may define at least one null adjacent the first main lobe.

Some embodiments of the method may include displaying, via a display, an image based upon position data from the first beam data.

In some embodiments, the transducer array may define a first row of transducer elements and a second row of transducer elements. The first row of transducer elements is configured to generate the first beam data associated with the first beam. The first row of transducer elements may be disposed proximate the second row of transducer elements such that a first transducer element in the first row may be positioned in the housing at a predetermined distance from a first transducer element of the second row of transducer elements and a second transducer element of the first row may be positioned in the housing at the predetermined distance from a second transducer element of the second row. In some embodiments, the method may further comprise generating a second beam data associated with a second beam based on the sonar return data received by the second row of transducer elements. The second beam may define at least one second main lobe oriented in the first direction. The generating step may include forming the sonar return data received by the second row of transducer elements in the first direction. The generating step may include applying a third predetermined window to the sonar return data received by the second row of transducer elements to define third weighted return data. In some embodiments, the third predetermined window may be configured to at least partially reduce the sonar return data outside the first direction in the third weighted return data. The generating step may include applying a fourth predetermined window to the sonar return data received by the second row of transducer elements to define fourth weighted return data. The fourth predetermined window may be configured to at least partially reduce the sonar return data outside the first direction in the fourth weighted return data. The generating step may include comparing a third power of the third weighted return data to a fourth power of the fourth weighted return data. The generating step may include defining, in an instance in which the third power is less than the fourth power, the second beam data based upon the third weighted return data. In some embodiments, the method may include generating, based on the sonar return data received by the first row of transducer elements and the second row of transducer elements, a set of 3D sonar return data associated with the underwater environment by generating one or more second angles within at least the first beam by correlating the sonar return data received by the first row of transducer elements and the sonar return data received by the second row of transducer elements in at least the first direction. The correlation may be based on the predetermined distance, and the one or more second angles may be oriented in a plane spanning the first row and the second row the first direction of first receive beam. The method may include generating a 3D image based on the generated set of 3D sonar return data.

Another embodiment may include a sonar system for adaptive beamforming. The system may include a transducer array comprising at least two transducer elements. The transducer array may be configured to receive sonar returns from a sonar pulse transmitted into an underwater environment. The transducer elements may be configured to convert sound energy of the sonar returns into sonar return data. In some embodiments, the sonar system may include a sonar signal processor configured to generate first beam data associated with a first beam having at least one first main lobe oriented in a first direction. The sonar signal processor may be configured to generate the first beam data based on the sonar return data. The sonar signal processor may be configured to form the sonar return data in the first direction. In some embodiments, the sonar signal processor may be configured to apply a first predetermined window to the sonar return data to define a first weighted return data. The first predetermined window may be configured to at least partially reduce the sonar return data outside the first direction in the first weighted return data. The sonar signal processor may be configured to apply a second predetermined window to the sonar return data to define a second weighted return data. The second predetermined window may be configured to at least partially reduce the sonar return data outside the first direction in the second weighted return data. The sonar signal processor may be configured to compare a first power of the first weighted return data to a second power of the second weighted return data. In some embodiments, the sonar signal processor may be configured to define, in an instance in which the first power is less than the second power, the first beam data based upon the first weighted return data.

In some embodiments, the sonar signal processor may be further configured to generate second beam data associated with a second beam having at least one second main lobe oriented in a second direction. The sonar signal processor may be configured to generate the second beam data based on the sonar return data. The sonar signal processor may be configured to form the sonar return data in the second direction. The sonar signal processor may be configured to apply a third predetermined window to the sonar return data to define a third weighted return data. In some embodiments, the third predetermined window may be configured to at least partially reduce the sonar return data outside the second direction in the third weighted return data. The sonar signal processor may be configured to apply a fourth predetermined window to the sonar return data to define a fourth weighted return data. The fourth predetermined window may be configured to at least partially reduce the sonar return data outside the second direction in the fourth weighted return data. The sonar signal processor may be configured to compare a third power of the third weighted return data to a fourth power of the fourth weighted return data. The sonar signal processor may be configured to define, in an instance in which the third power is less than the fourth power, the second beam data based upon the third weighted return data.

The sonar signal processor may be configured to form the sonar return data in the first direction using a phase shift of the sonar returns received by one or more of the at least two transducer to align the sonar returns received by each of the at least two transducer elements in the first direction.

In some embodiments, the first predetermined window may be the same as the third predetermined window. In some other embodiments, the first predetermined window may be different from the third predetermined window.

The first predetermined window may define an average of a first plurality of predetermined windows. The first plurality of predetermined windows may include at least a fifth predetermined window and a sixth predetermined window. The sonar signal processor may be further configured to apply the fifth predetermined window to the sonar return data to define a fifth weighted return data. The fifth predetermined window may be configured to at least partially reduce the sonar return data outside the first direction in the fifth weighted return data. The sonar signal processor may be configured to apply the sixth predetermined window to the sonar return data to define a sixth weighted return data. The sixth predetermined window may be configured to at least partially reduce the sonar return data outside the first direction in the sixth weighted return data. The sonar signal processor may be configured to compare a fifth power of the fifth weighted return data to a sixth power of the sixth weighted return data. In an instance in which the fifth power is less than the sixth power, the sonar signal processor may be configured to define the first beam data based upon the first weighted return data by defining the first beam data based upon the fifth weighted return data.

In some embodiments, the second predetermined window may define an average of a second plurality of predetermined windows. In some embodiments, the first plurality of predetermined windows comprises eight predetermined windows, including the fifth predetermined window and the sixth predetermined window. In some embodiments, the second plurality of predetermined windows comprises eight predetermined windows.

In some embodiments, the first main lobe is symmetric about the first direction. In some embodiments, the first main lobe is offset from the first direction. In some embodiments, the first predetermined window comprises unit gain in the first direction. The second predetermined window may comprise unit gain in the first direction. The first beam may define at least one null adjacent the first main lobe.

In some embodiments, the system may further comprise a display configured to display an image based upon position data from the first beam data. The transducer array may define a first row of transducer elements and a second row of transducer elements. The first row of transducer elements may be configured to generate the first beam data associated with the first beam. The first row of transducer elements may be disposed proximate the second row of transducer elements such that a first transducer element in the first row may be positioned in the housing at a predetermined distance from a first transducer element of the second row of transducer elements and a second transducer element of the first row may be positioned in the housing at the predetermined distance from a second transducer element of the second row. In some embodiments, the system may be further configured to generate a second beam data associated with a second beam based on the sonar return data received by the second row of transducer elements. The second beam may define at least one second main lobe oriented in the first direction. The system may be further configured to form the sonar return data received by the second row of transducer elements in the first direction. The system may be configured to apply a third predetermined window to the sonar return data received by the second row of transducer elements to define third weighted return data. The third predetermined window may be configured to at least partially reduce the sonar return data outside the first direction in the third weighted return data. The system may be configured to apply a fourth predetermined window to the sonar return data received by the second row of transducer elements to define fourth weighted return data. The fourth predetermined window may be configured to at least partially reduce the sonar return data outside the first direction in the fourth weighted return data. The system may be configured to compare a third power of the third weighted return data to a fourth power of the fourth weighted return data. The system may be configured to define, in an instance in which the third power is less than the fourth power, the second beam data based upon the third weighted return data. In some embodiments, the system may be configured to generate, based on the sonar return data received by the first row of transducer elements and the second row of transducer elements, a set of 3D sonar return data associated with the underwater environment. The system may be configured to generate one or more second angles within at least the first beam by correlating the sonar return data received by the first row of transducer elements and the sonar return data received by the second row of transducer elements in at least the first direction. The correlation may be based on the predetermined distance. The one or more second angles may be oriented in a plane spanning the first row and the second row the first direction of first receive beam. The system may further be configured to generate a 3D image based on the generated set of 3D sonar return data.

In yet another embodiment, a computer program product may be provided that may include a non-transitory computer readable storage medium and computer program instructions stored therein. The computer program instructions may comprise program instructions configured to receive, via a transducer array, sonar returns from a sonar pulse transmitted into an underwater environment and convert the sound energy of the sonar returns into sonar return data. The transducer array may include at least two transducer elements. The computer program product may be configured to generate, via a sonar signal processor, first beam data associated with a first beam based on the sonar return data. The first beam may define at least one first main lobe oriented in a first direction. The computer program product may be further configured to form the sonar return data in the first direction. The computer program product may be configured to apply a first predetermined window to the sonar return data to define a first weighted return data. The first predetermined window may be configured to at least partially reduce the sonar return data outside the first direction in the first weighted return data. The computer program product may be configured to apply a second predetermined window to the sonar return data to define a second weighted return data. The second predetermined window may be configured to at least partially reduce the sonar return data outside the first direction in the second weighted return data. The computer program product may be configured to compare a first power of the first weighted return data to a second power of the second weighted return data. In some embodiments, the computer program product may be configured to define, in an instance in which the first power is less than the second power, the first beam data based upon the first weighted return data.

In some embodiments, the computer program product may be configured to generate second beam data associated with a second beam based on the sonar return data. The second beam may define at least one second main lobe oriented in a second direction. The computer program product may be further configured to form the sonar return data in the second direction. The computer program product may be configured to apply a third predetermined window to the sonar return data to define a third weighted return data. The third predetermined window may be configured to at least partially reduce the sonar return data outside the second direction in the third weighted return data. The computer program product may be configured to apply a fourth predetermined window to the sonar return data to define a fourth weighted return data. The fourth predetermined window may be configured to at least partially reduce the sonar return data outside the second direction in the fourth weighted return data. The computer program product may be configured to compare a third power of the third weighted return data to a fourth power of the fourth weighted return data. The computer program product may be configured to define, in an instance in which the third power is less than the fourth power, the second beam data based upon the second weighted return data.

In some embodiments, the sonar return data may be configured to be formed in the first direction for the first beam data by applying a phase shift to the sonar returns received by one or more of the at least two transducer elements to align the sonar returns received by each of the at least two transducer elements in the first direction.

In some embodiments, the first predetermined window may be the same as the third predetermined window. In some other embodiments, the first predetermined window may be different from the third predetermined window. The first predetermined window may define an average of a first plurality of predetermined windows. The first plurality of predetermined windows may include at least a fifth predetermined window and a sixth predetermined window. The computer program product may be further configured to apply the fifth predetermined window to the sonar return data to define a fifth weighted return data. The fifth predetermined window may be configured to at least partially reduce the sonar return data outside the first direction in the fifth weighted return data. The computer program product may be configured to apply the sixth predetermined window to the sonar return data to define a sixth weighted return data. The sixth predetermined window may be configured to at least partially reduce the sonar return data outside the first direction in the sixth weighted return data. The computer program product may be configured to compare a fifth power of the fifth weighted return data to a sixth power of the sixth weighted return data. In an instance in which the fifth power is less than the sixth power, the computer program product may be further configured to define the first beam data based upon the first weighted return data by defining the first beam data based upon the fifth weighted return data.

In some embodiments, comparing the fifth power of the fifth weighted return data to the sixth power of the sixth weighted return data may further comprise comparing the first power of the first weighted return data to the fifth power and the sixth power, such that in an instance in which the fifth power is less than the sixth power and the first power, the first beam data may be based upon the fifth weighted return data.

In some embodiments, the second predetermined window may define an average of a second plurality of predetermined windows. In some embodiments, the plurality of predetermined windows may comprise eight predetermined windows, including the fifth predetermined window and the sixth predetermined window. The second plurality of predetermined windows may comprise eight predetermined windows. The first main lobe may be symmetric about the first direction. In some other embodiments, the first main lobe may be offset from the first direction.

In some embodiments, the first predetermined window may comprise unit gain in the first direction. In some embodiments, the second predetermined window may comprise unit gain in the first direction. In some embodiments, the first beam may define at least one null adjacent the first main lobe.

The computer program product may be further configured to display, via a display, an image based upon position data from the first beam data.

In some embodiments, the transducer array may define a first row of transducer elements and a second row of transducer elements. The first row of transducer elements may be configured to generate the first beam data associated with the first beam. The first row of transducer elements may be disposed proximate the second row of transducer elements such that a first transducer element in the first row may be positioned in the housing at a predetermined distance from a first transducer element of the second row of transducer elements and a second transducer element of the first row may be positioned in the housing at the predetermined distance from a second transducer element of the second row. The computer program product may be further configured to generate a second beam data associated with a second beam based on the sonar return data received by the second row of transducer elements. The second beam may define at least one second main lobe oriented in the first direction. The computer program product may be further configured to form the sonar return data received by the second row of transducer elements in the first direction. The computer program product may be configured to apply a third predetermined window to the sonar return data received by the second row of transducer elements to define third weighted return data. The third predetermined window may be configured to at least partially reduce the sonar return data outside the first direction in the third weighted return data. The computer program product may be configured to apply a fourth predetermined window to the sonar return data received by the second row of transducer elements to define fourth weighted return data. The fourth predetermined window may be configured to at least partially reduce the sonar return data outside the first direction in the fourth weighted return data. The computer program product may be configured to compare a third power of the third weighted return data to a fourth power of the fourth weighted return data. The computer program product may be configured to define, in an instance in which the third power is less than the fourth power, the second beam data based upon the third weighted return data. The computer program product may be configured to generate, based on the sonar return data received by the first row of transducer elements and the second row of transducer elements, a set of 3D sonar return data associated with the underwater environment. The computer program product may be configured to generate one or more second angles within at least the first beam by correlating the sonar return data received by the first row of transducer elements and the sonar return data received by the second row of transducer elements in at least the first direction. The correlation may be based on the predetermined distance, and the one or more second angles may be oriented in a plane spanning the first row and the second row the first direction of first receive beam. The computer program product may be configured to generate a 3D image based on the generated set of 3D sonar return data.

BRIEF DESCRIPTION OF THE DRAWINGS

Figure 1A:
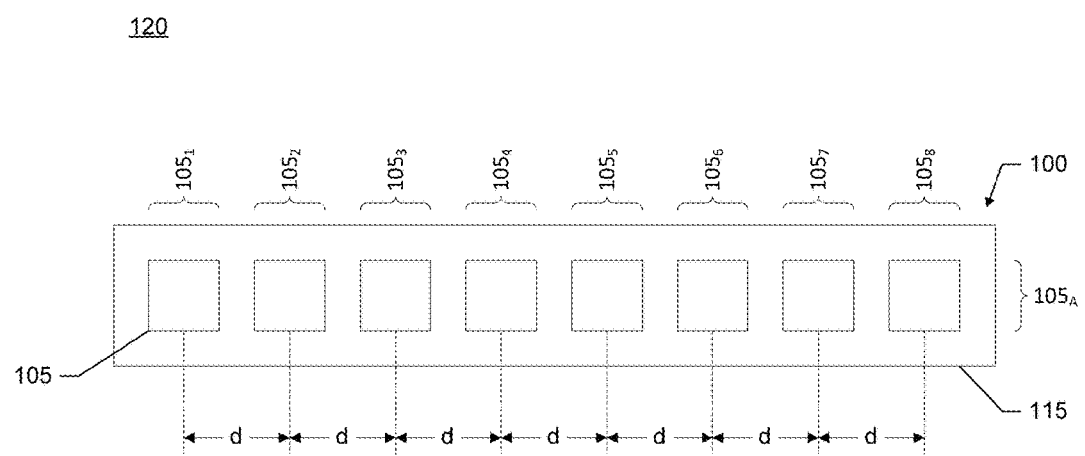
Figure 1B:
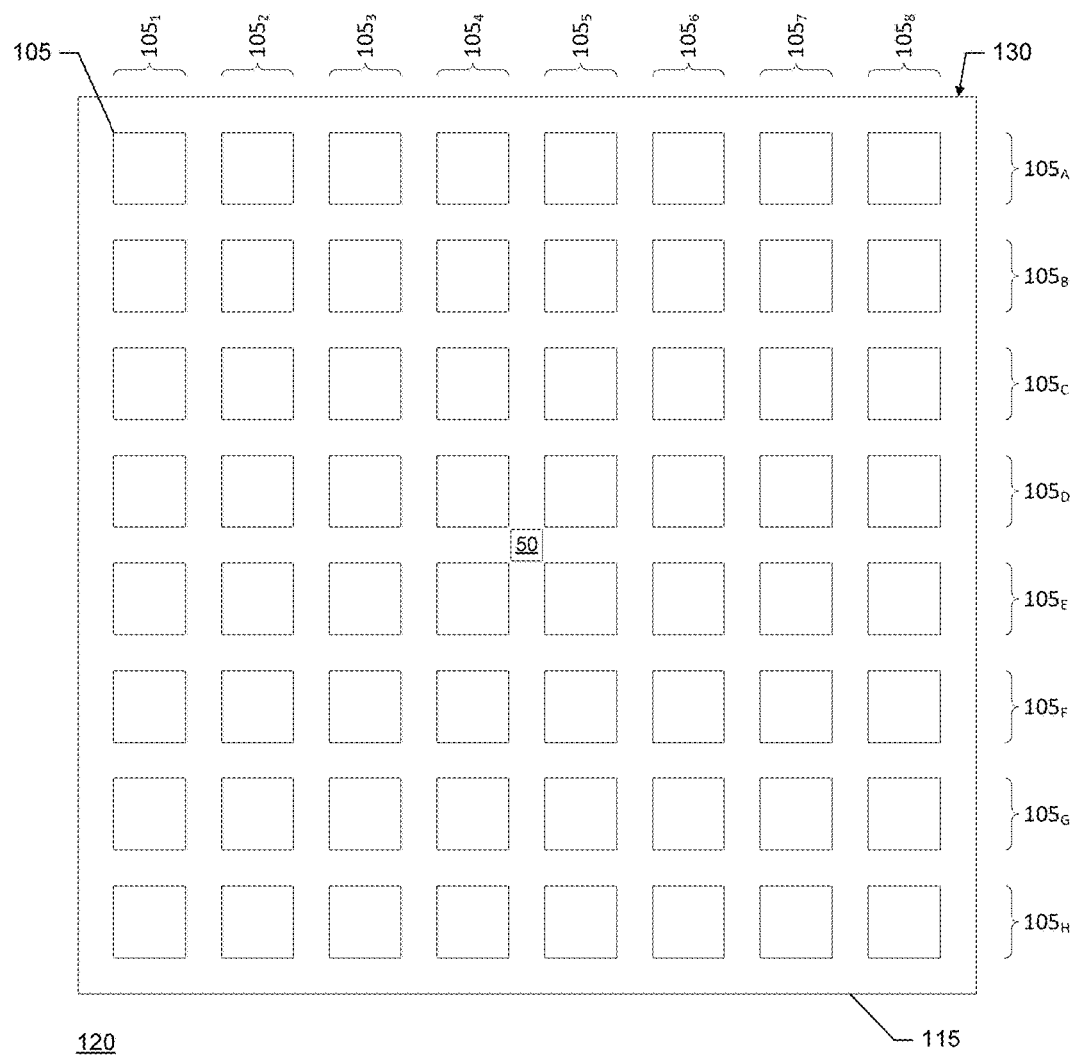
Figure 2A:
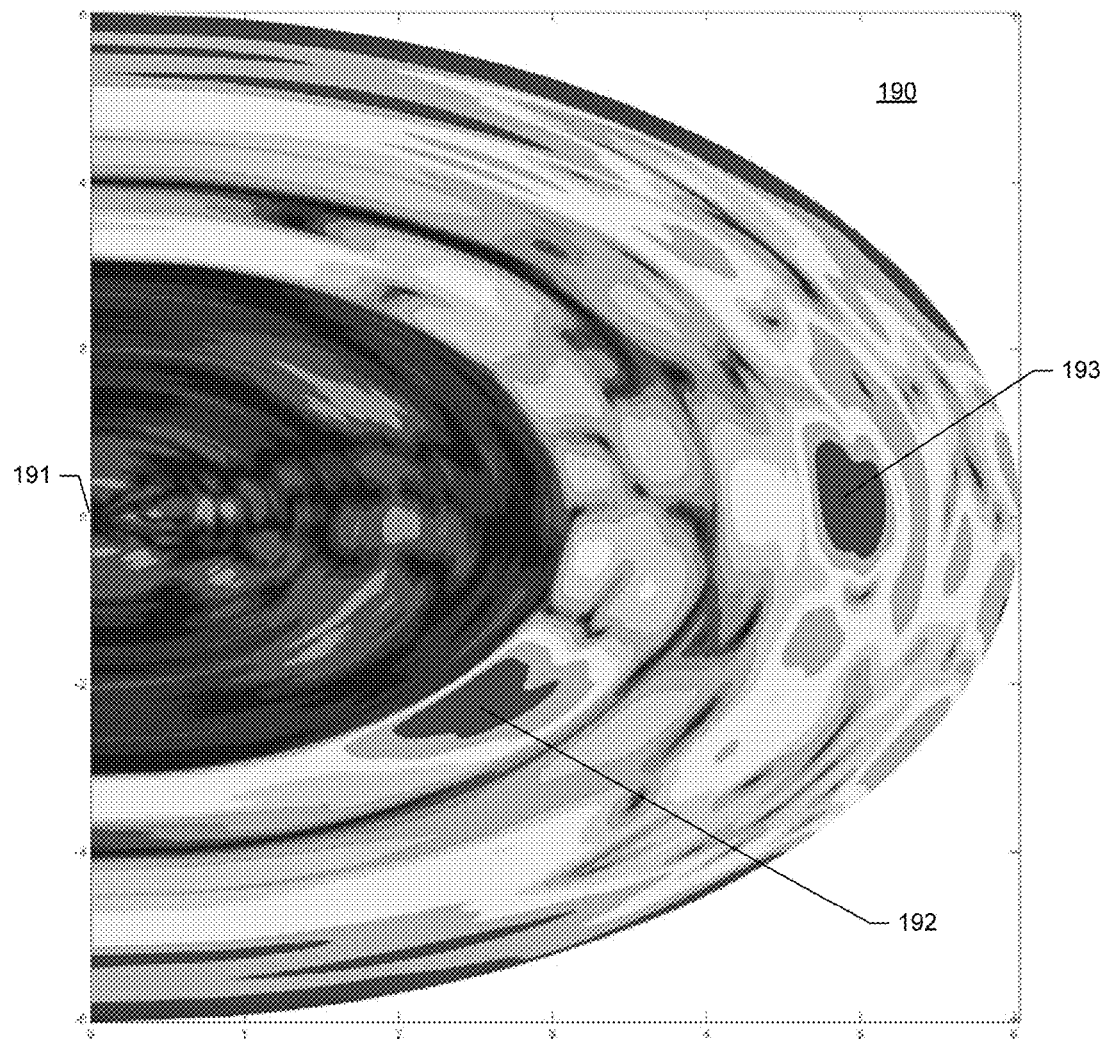
Figure 2B:
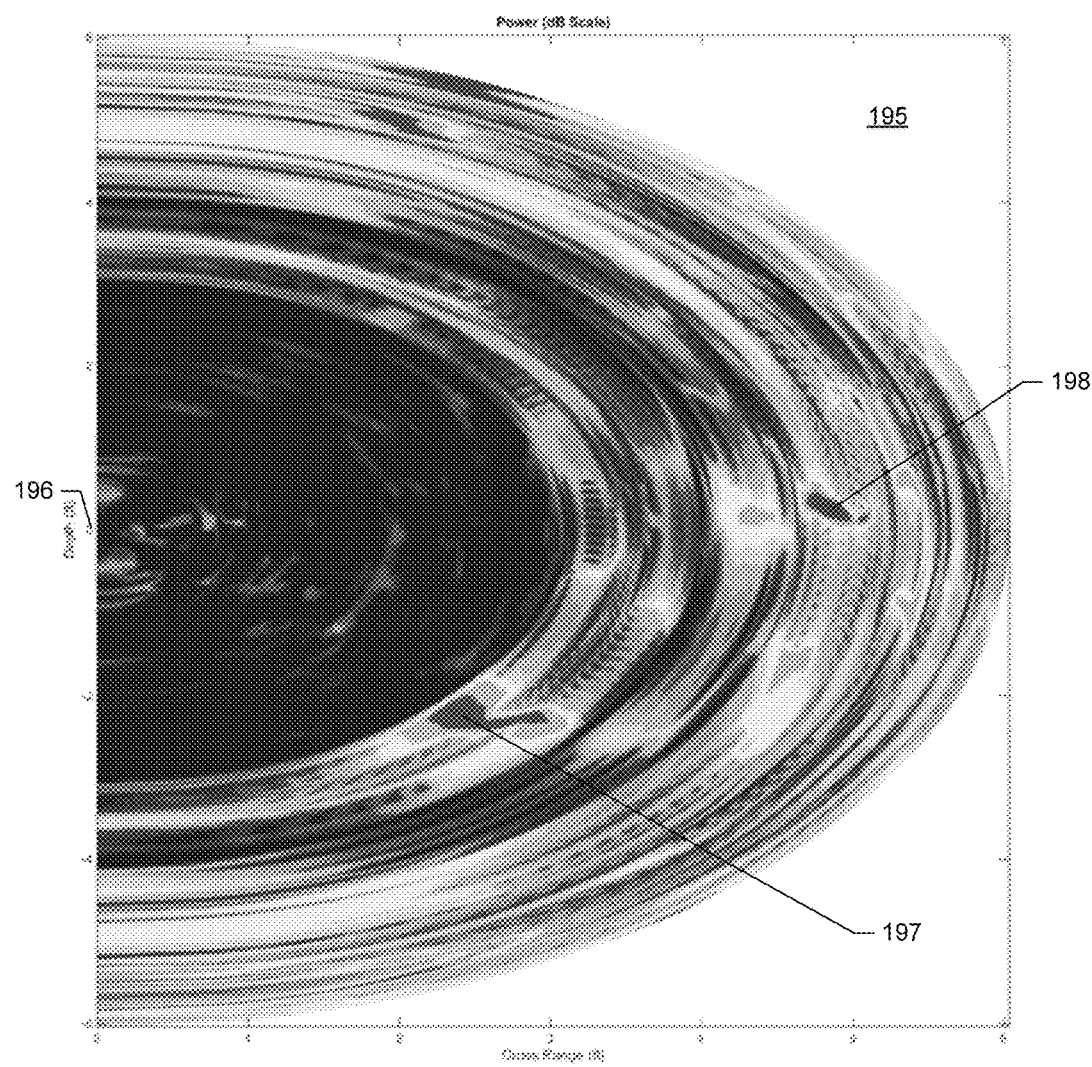
Figure 3:
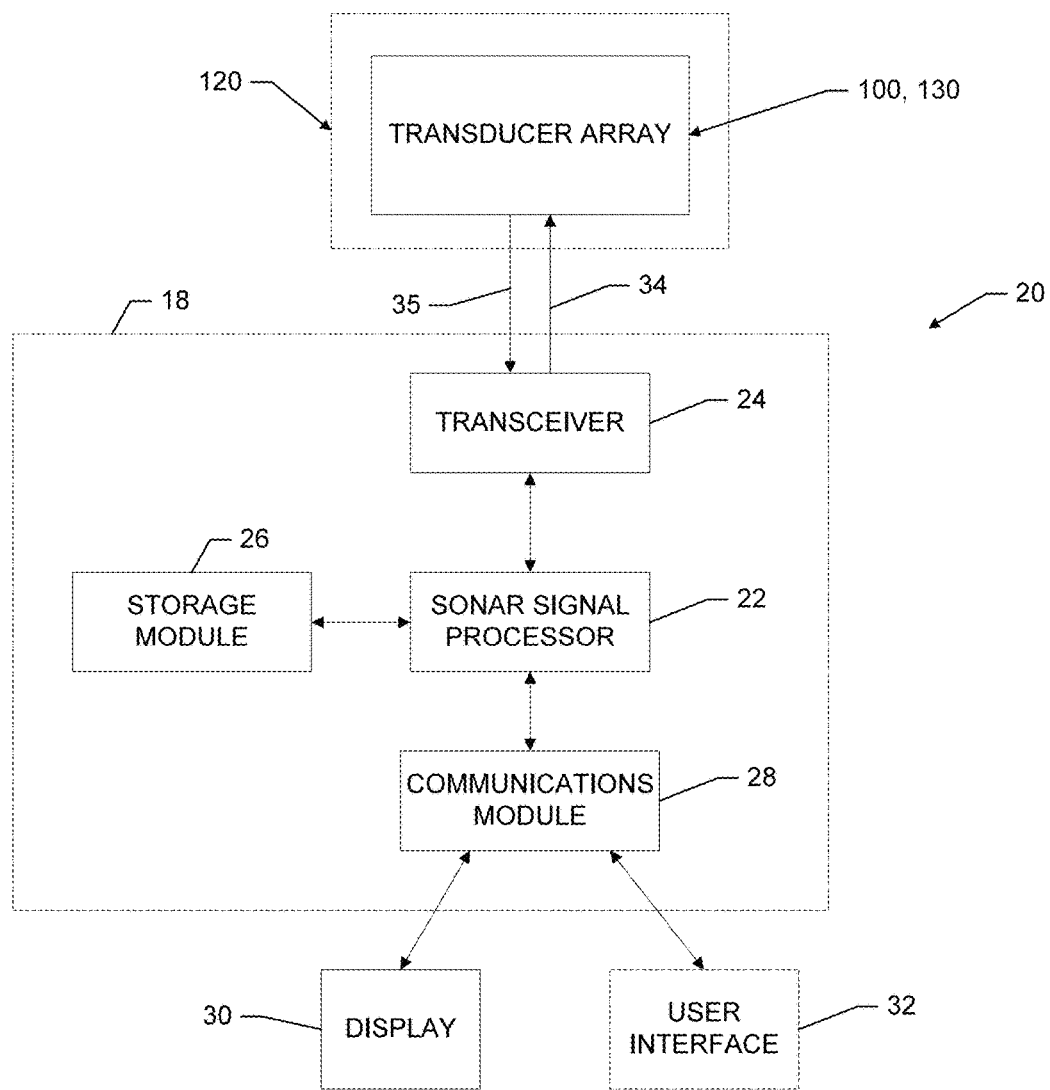
Figure 4:
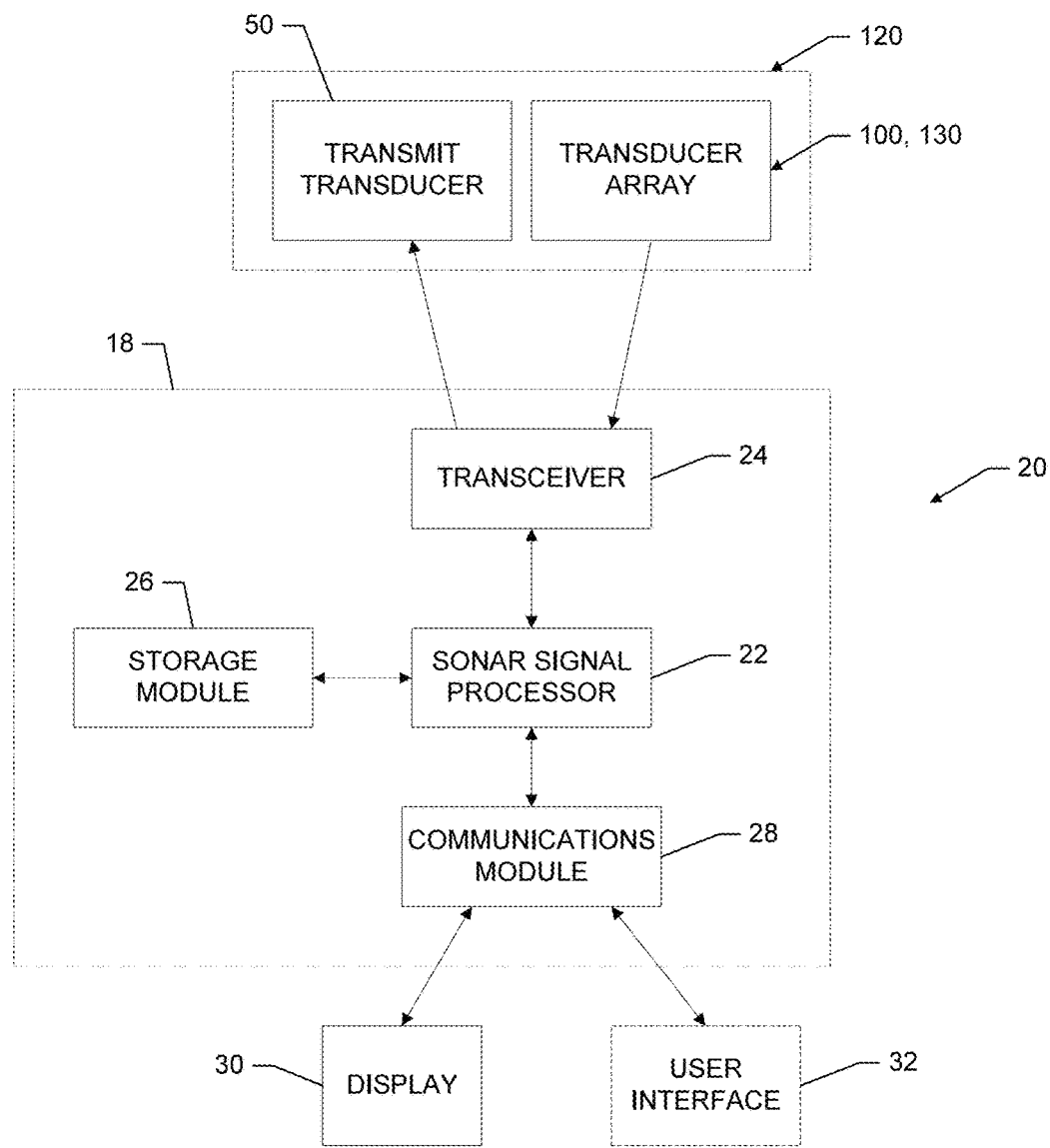
Figure 5:
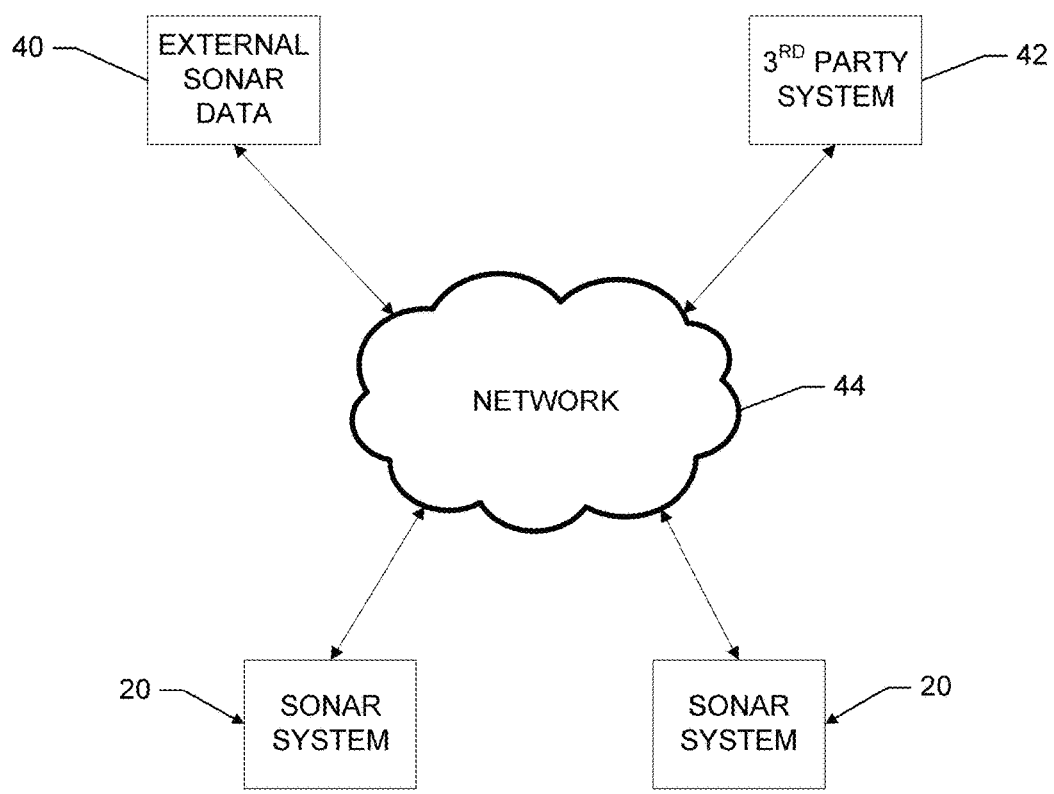
Figure 6:
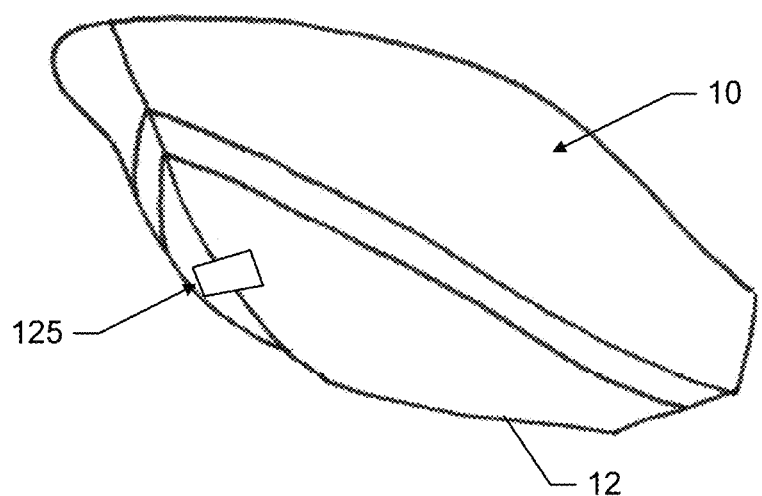
Figure 7:
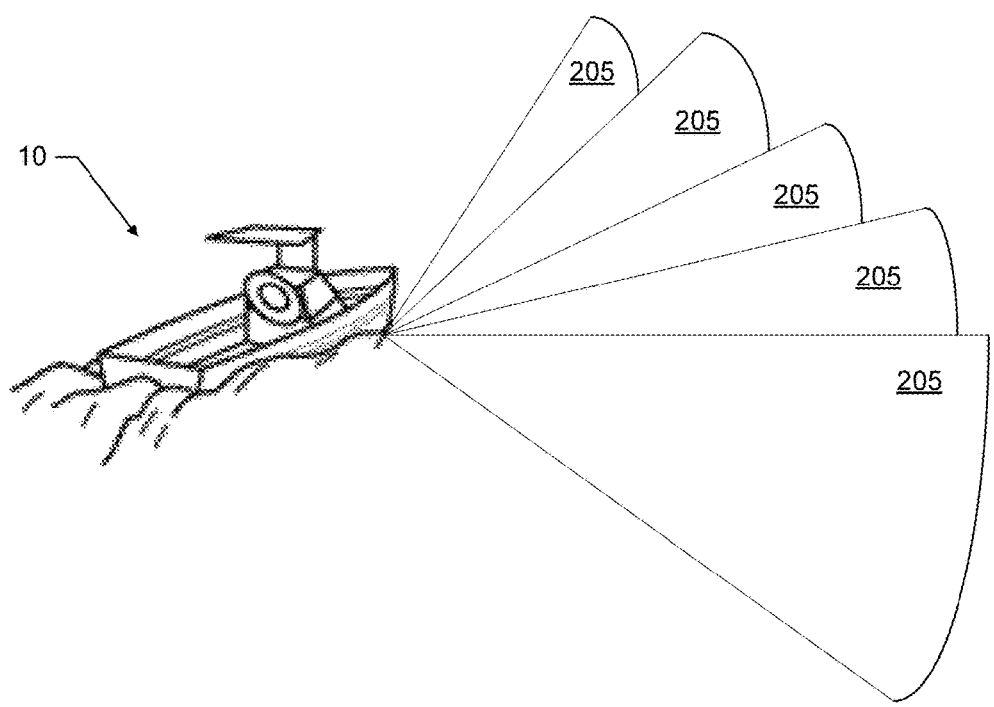
Figure 8:
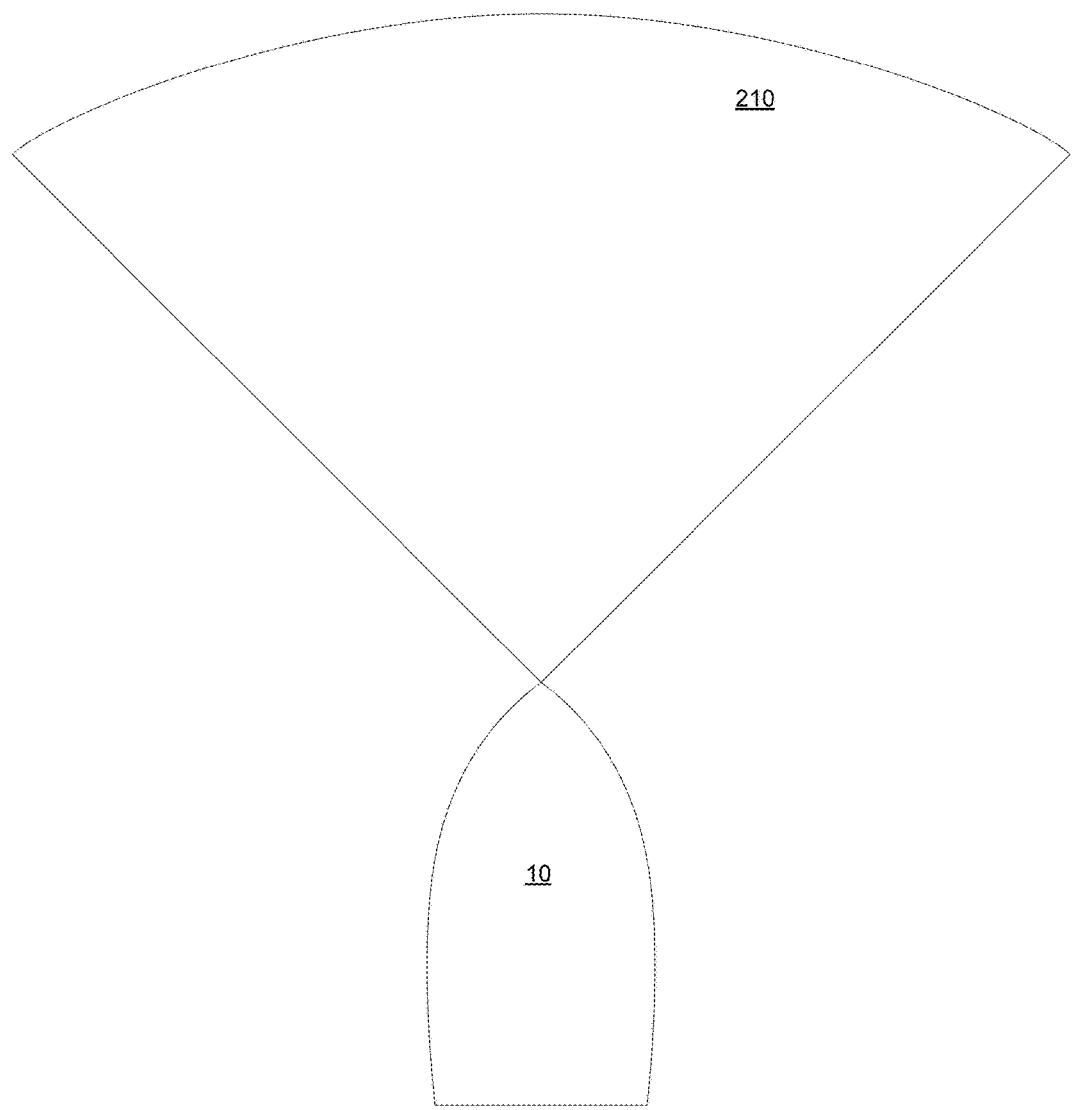
Figure 9:
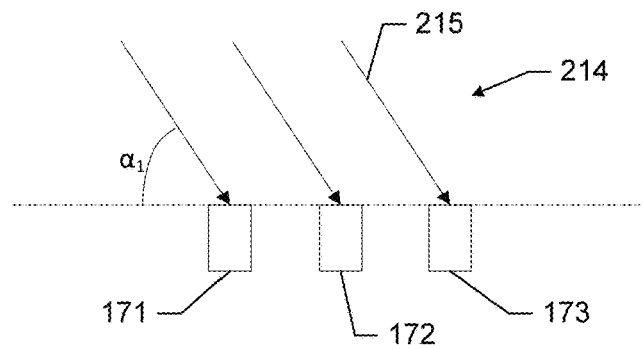
Figure 10:
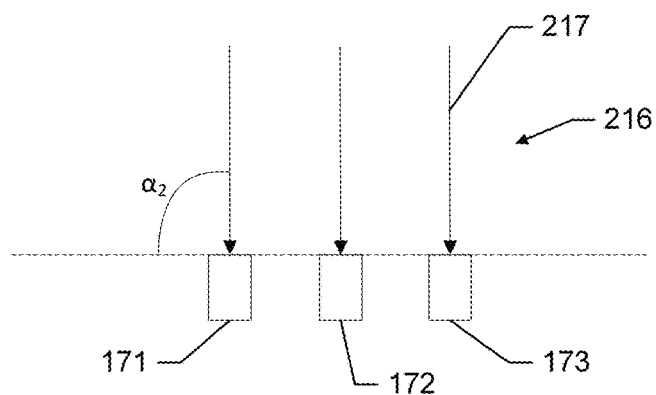
Figure 11:
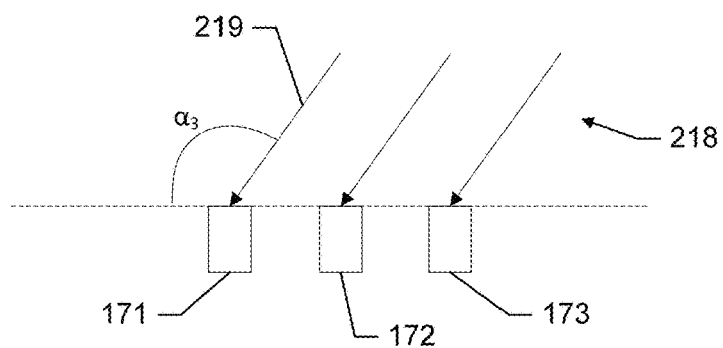
Figure 12:
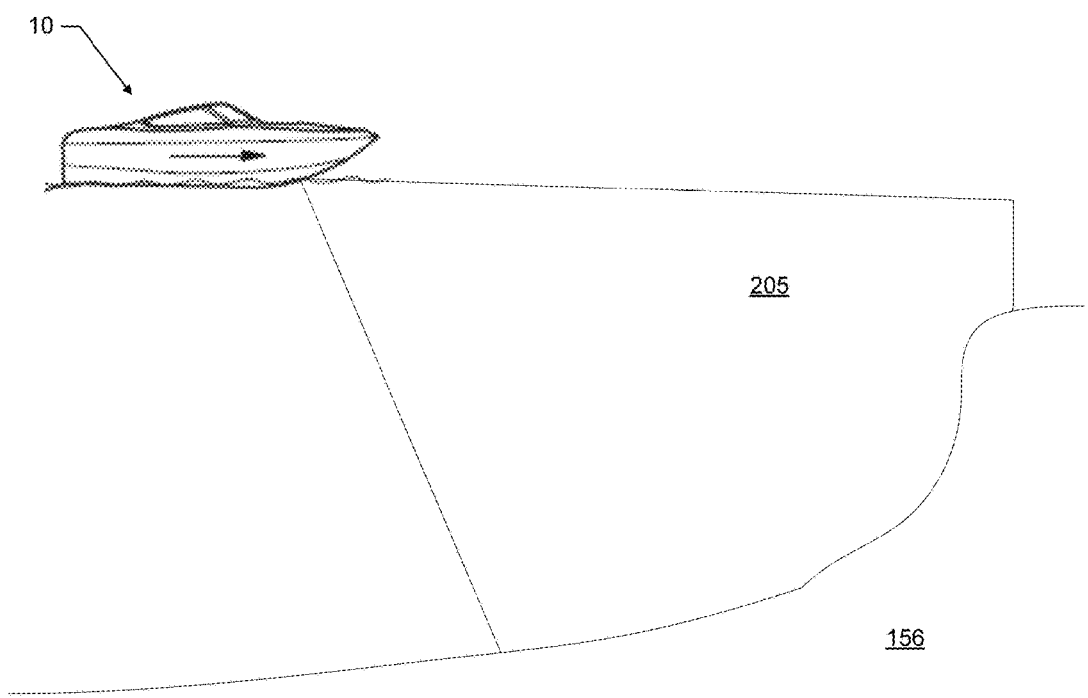
Figure 13:
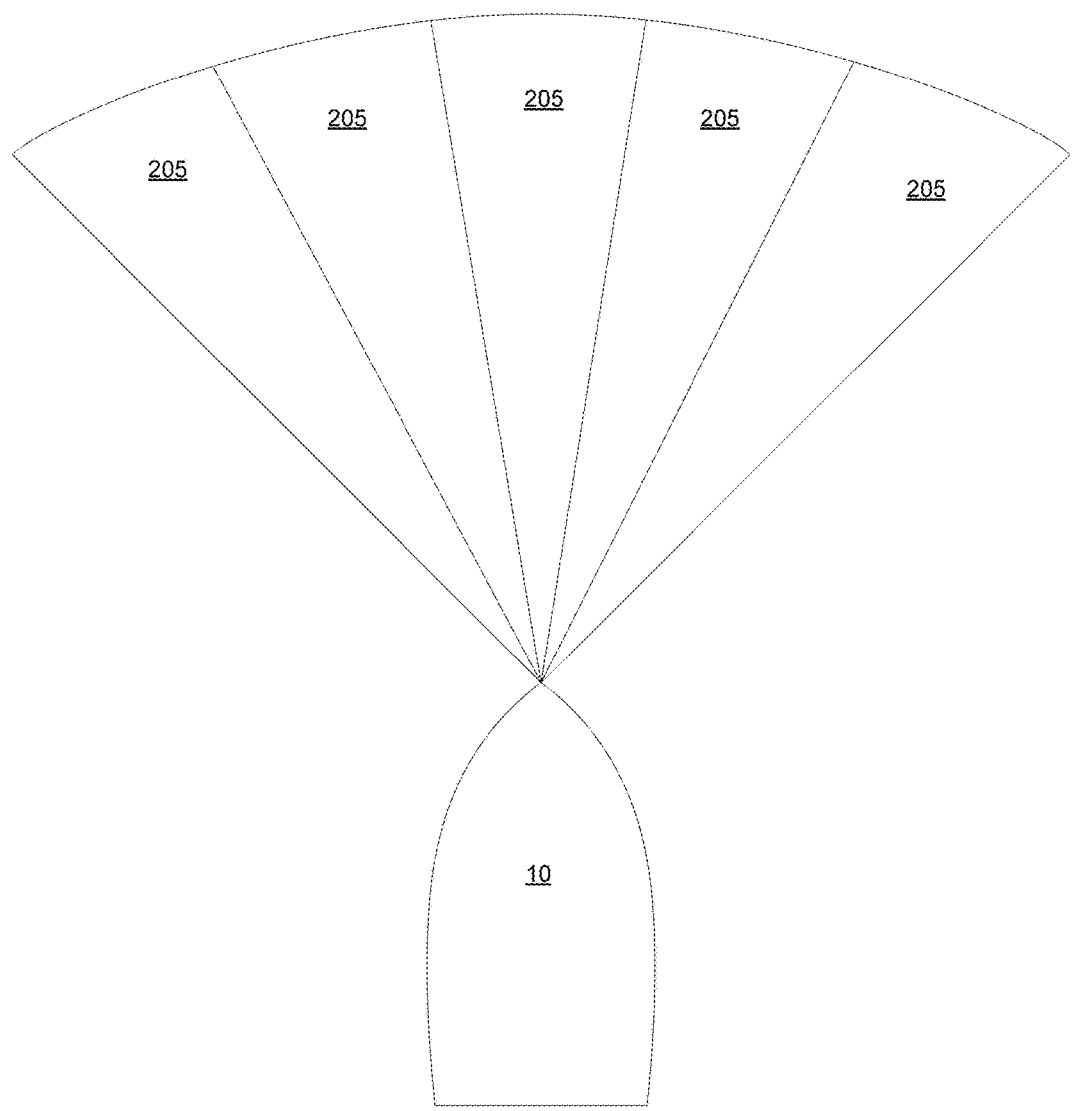
Figure 14:
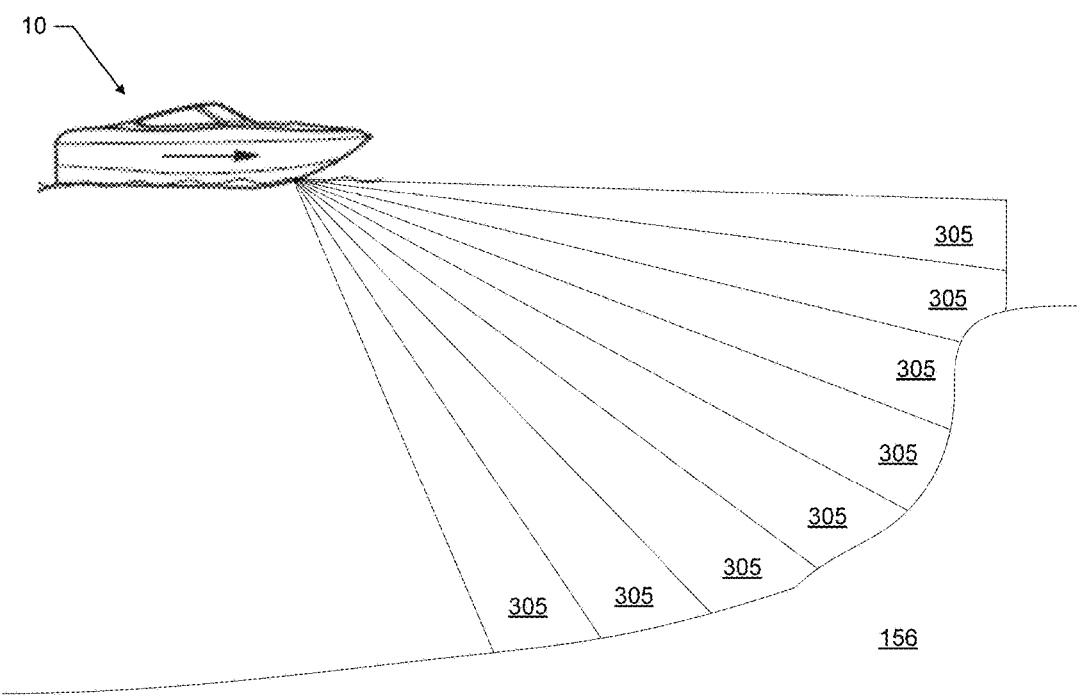
Figure 15:
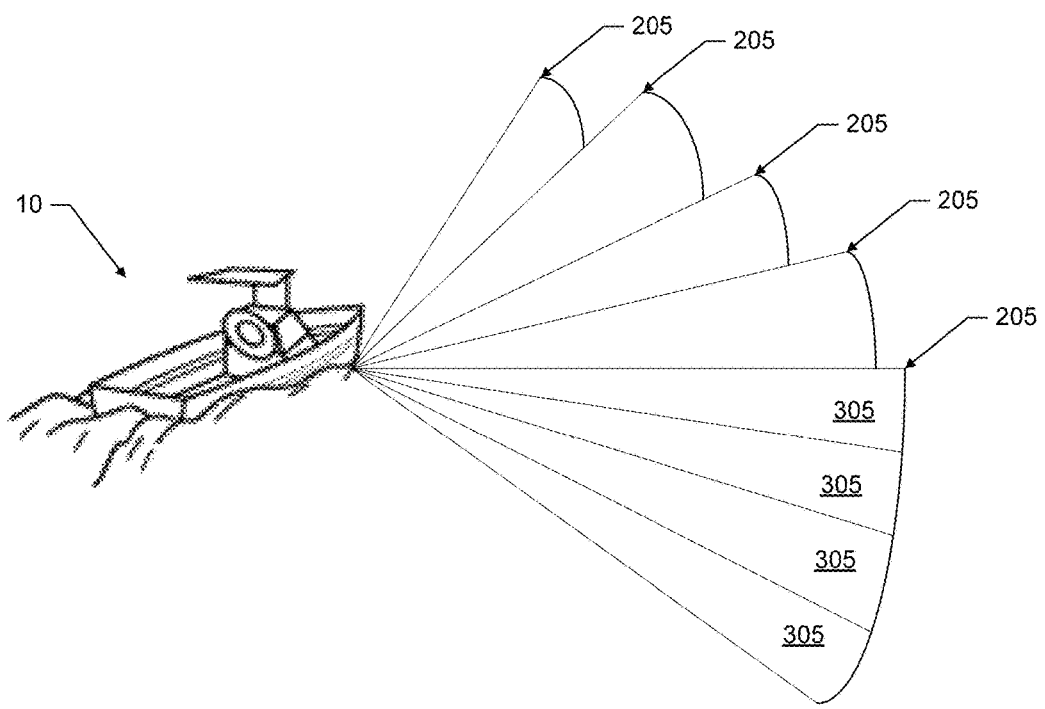
Figure 16:
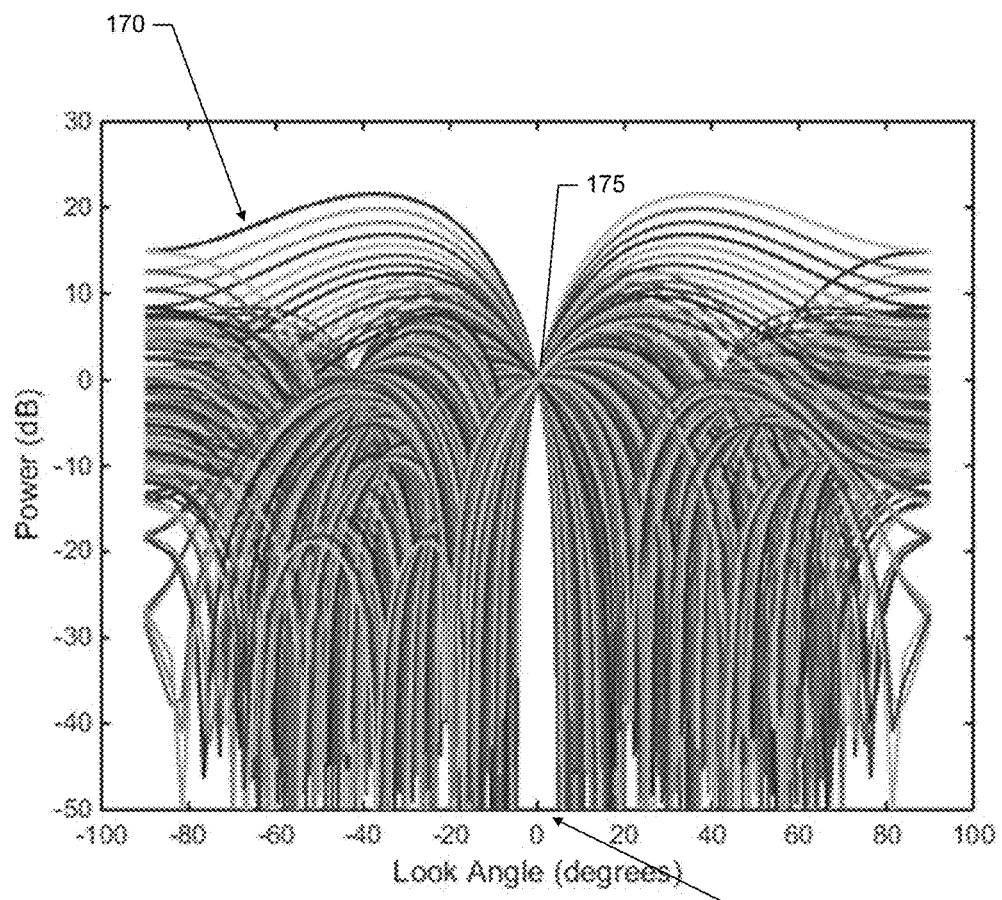
Figure 17A:
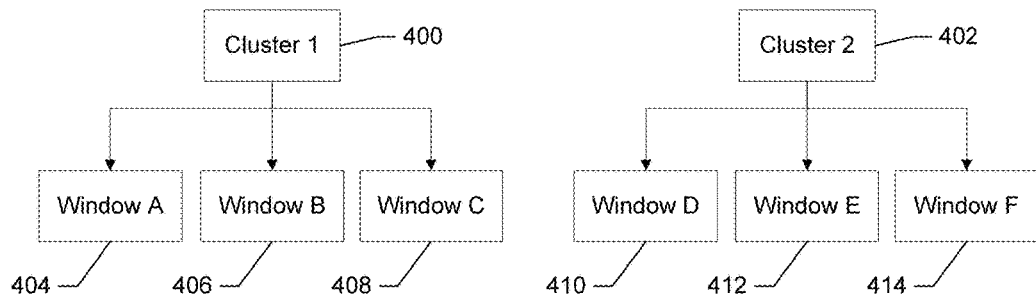
Figure 17B:
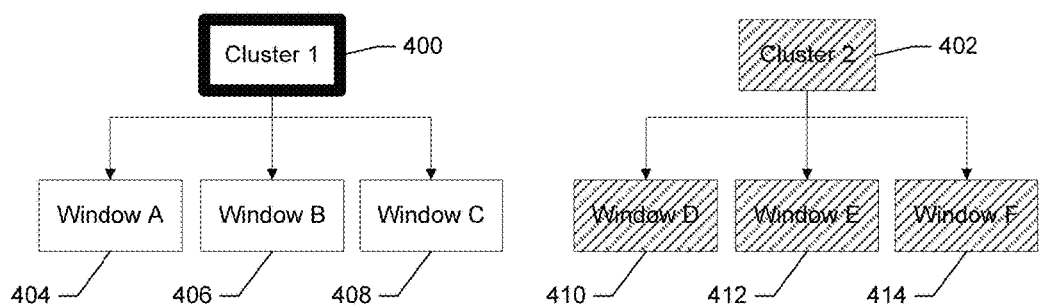
Figure 17C:
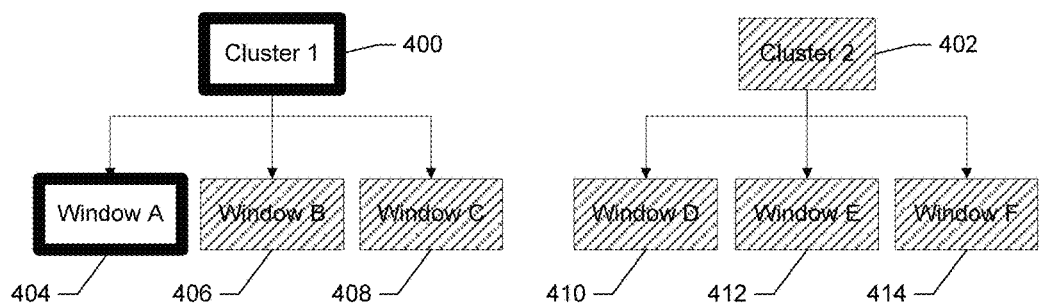
Figure 18:
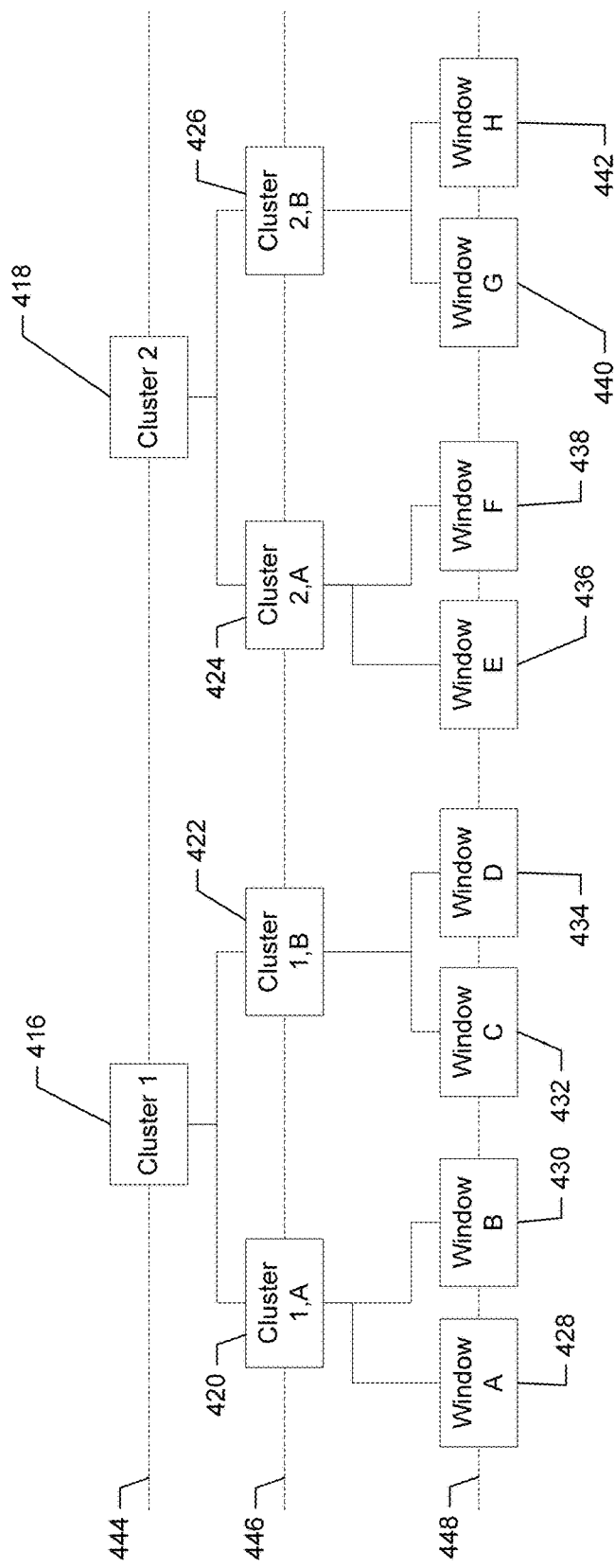
Figure 19:
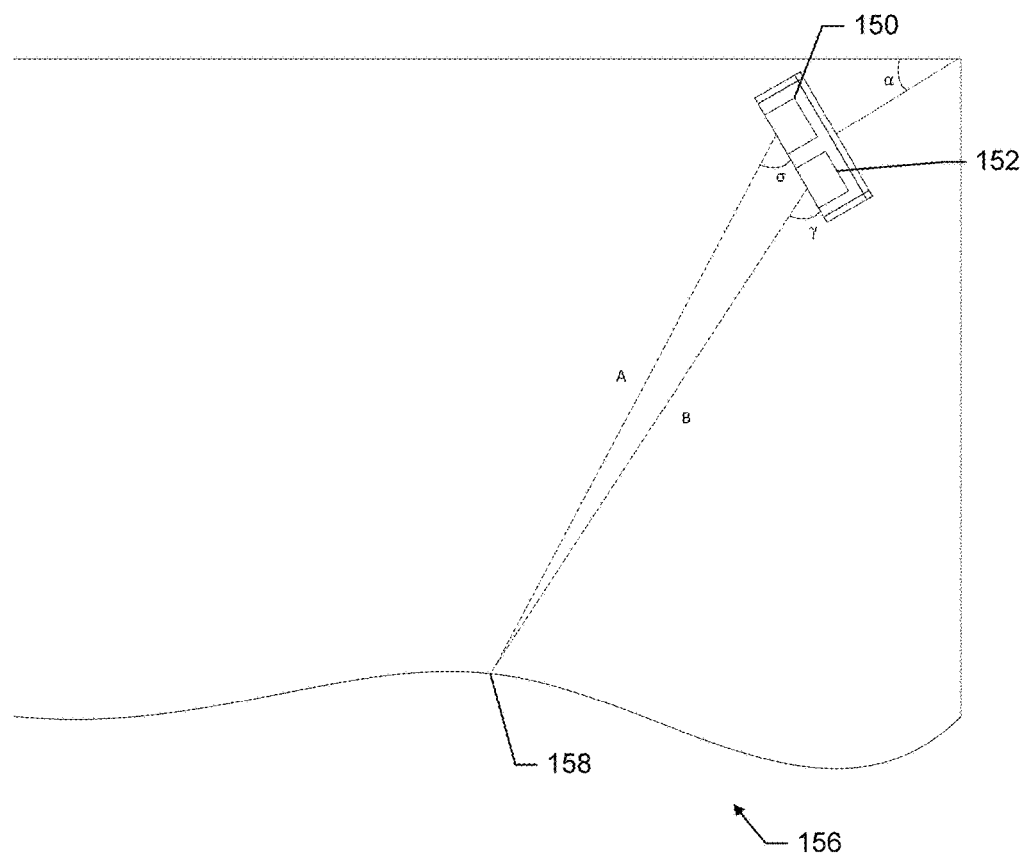
Figure 20:
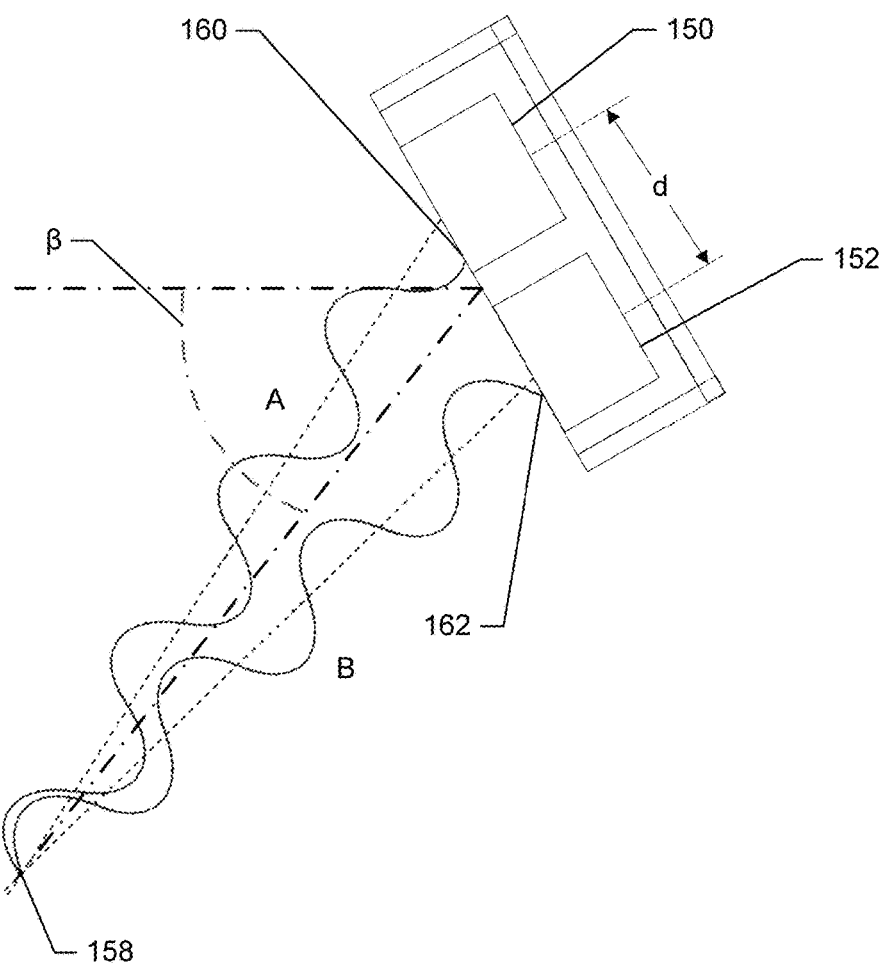
Figure 21:
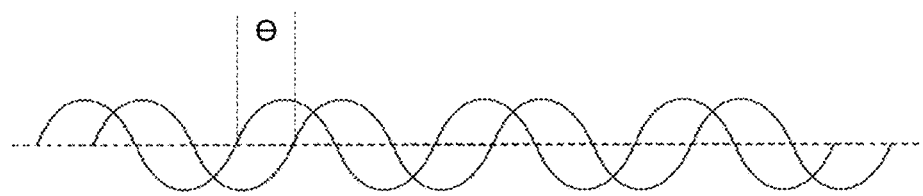
Figure 22:
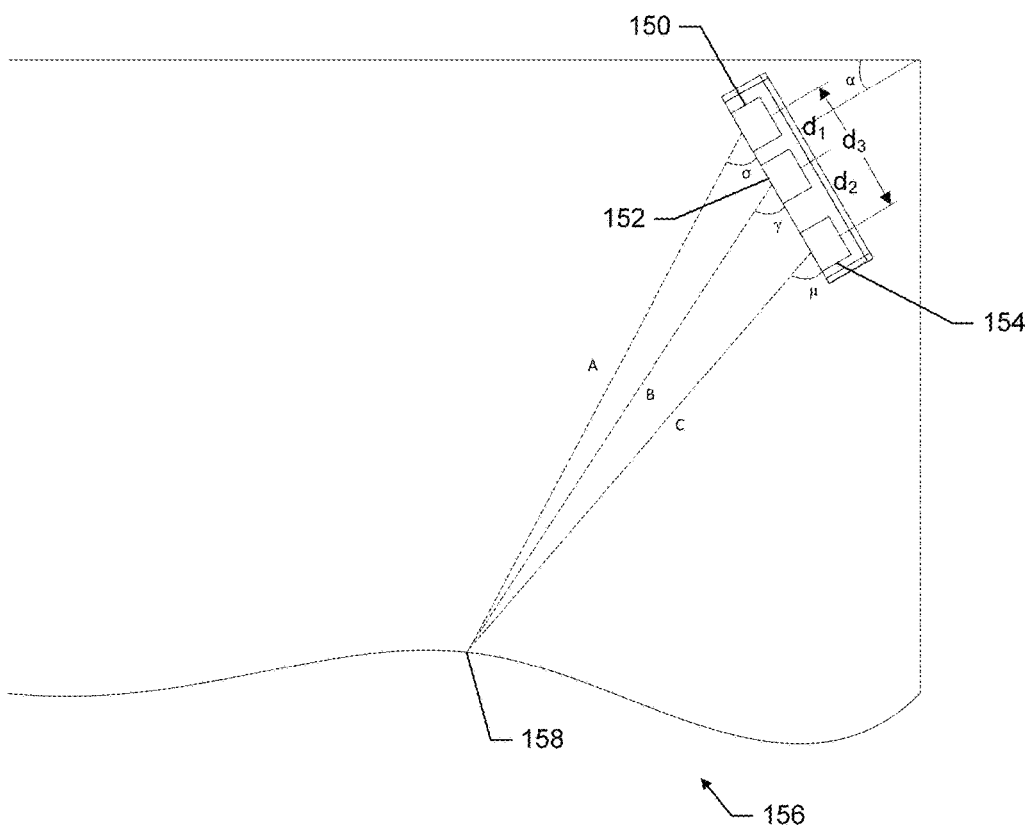
Figure 23:
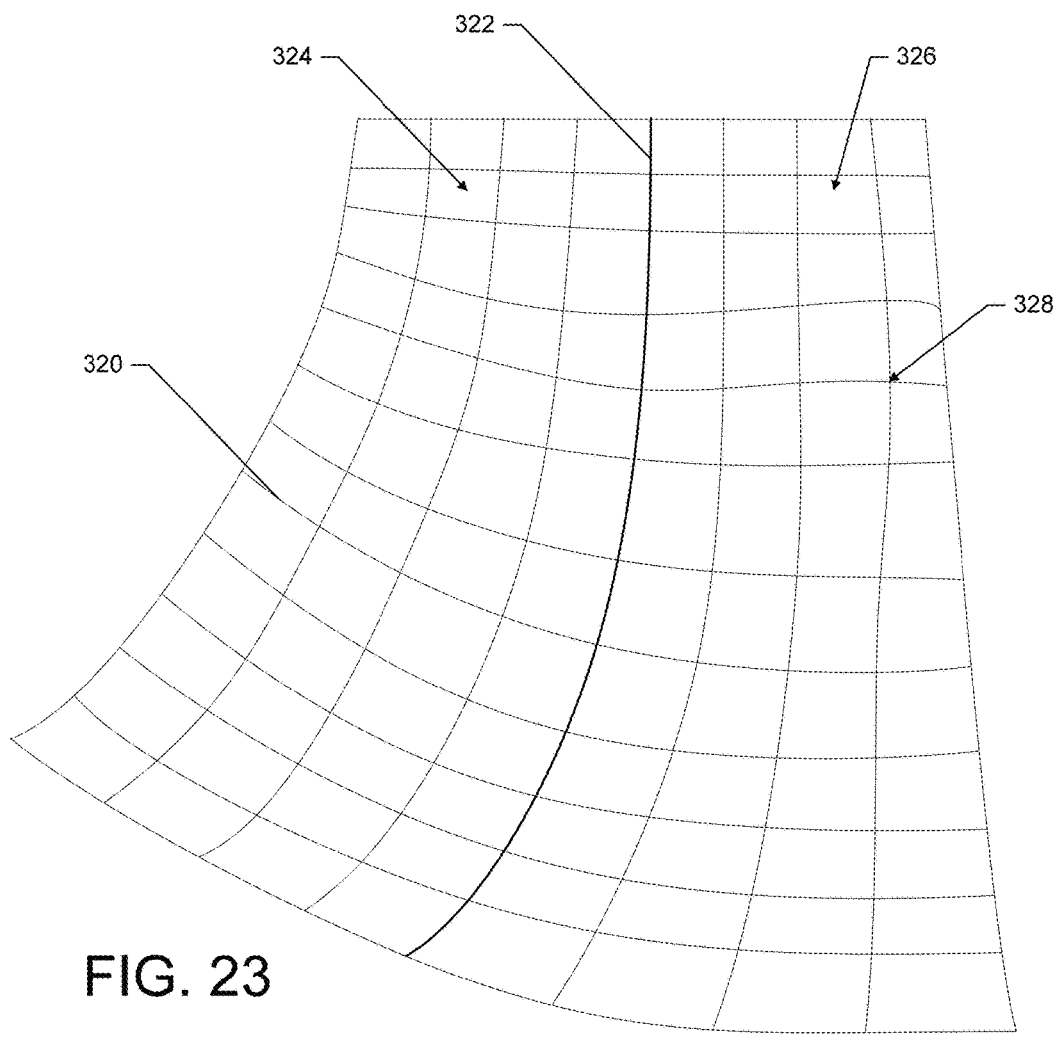
Figure 24:
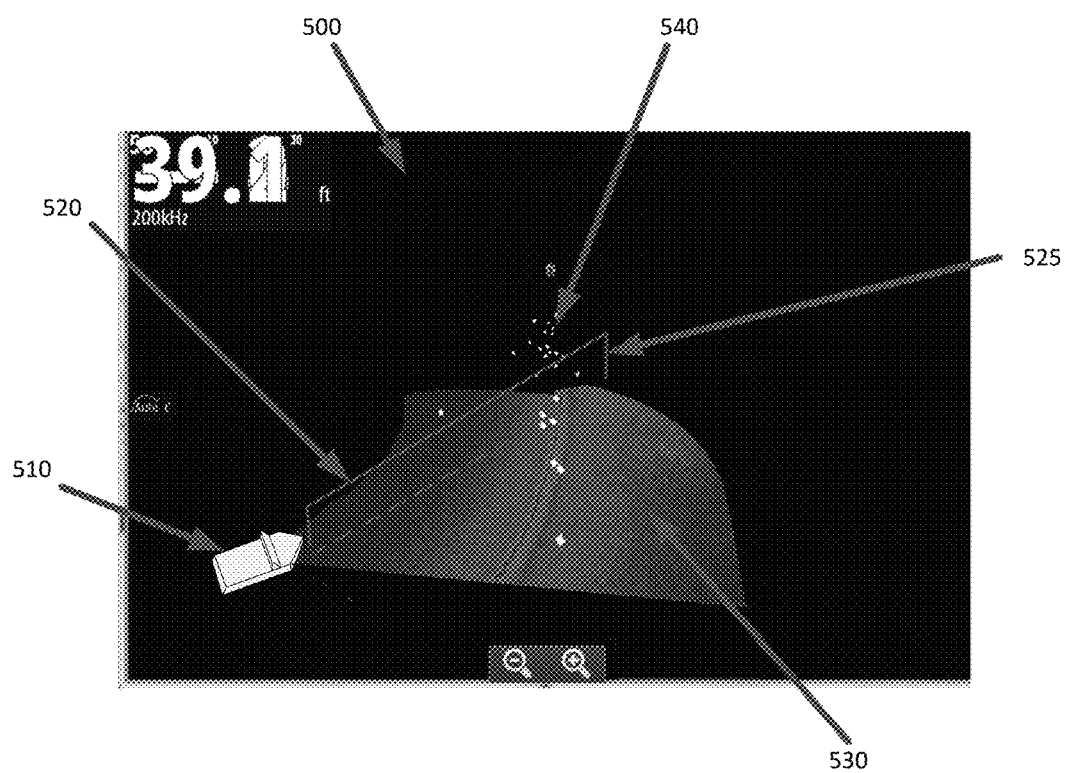
Figure 25:
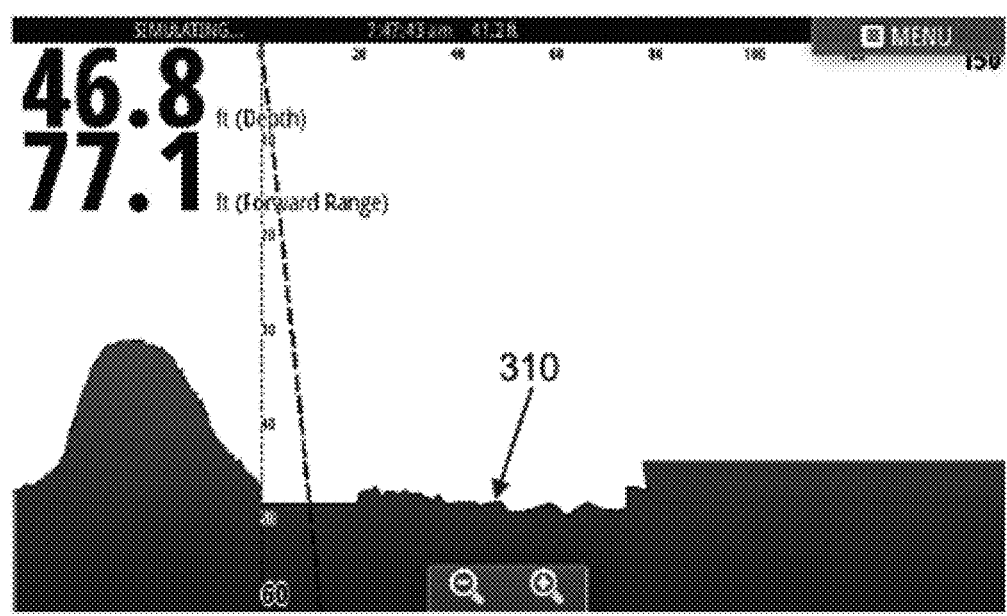
Figure 26:
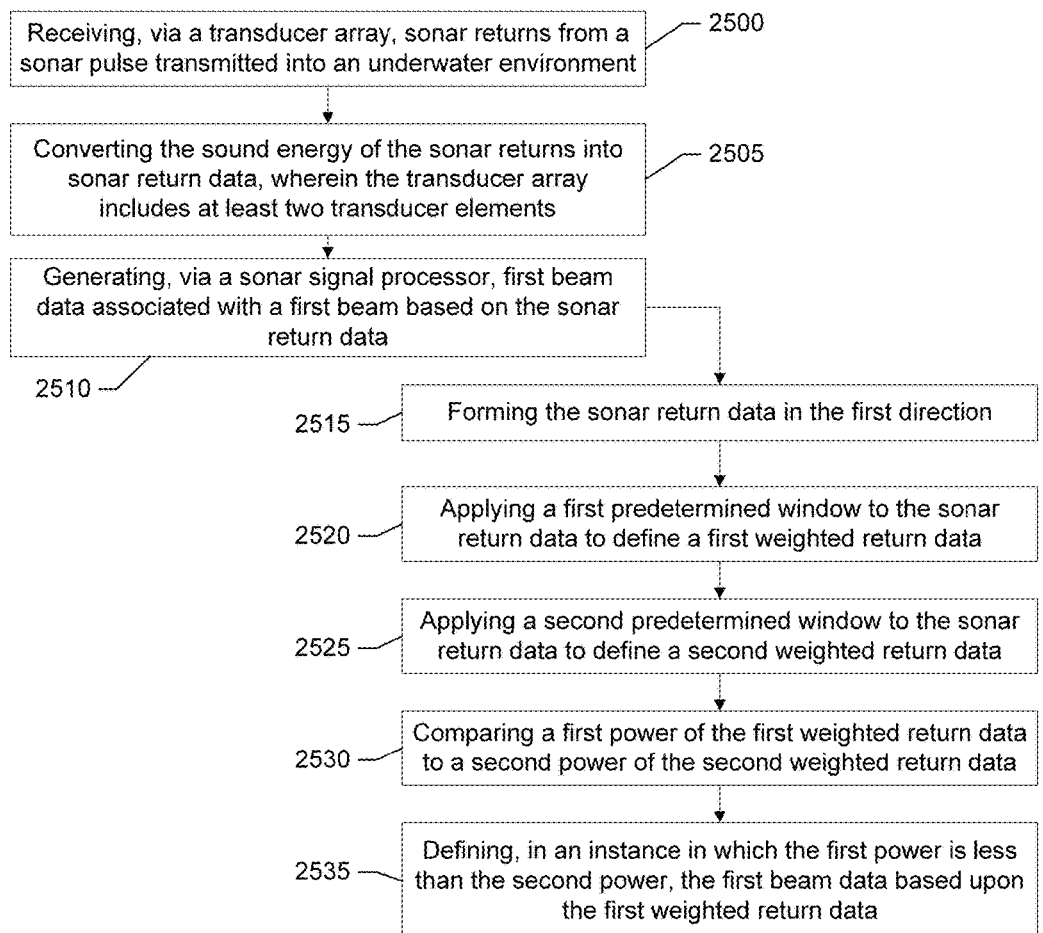

Having thus described the invention in general terms, reference will now be made to the accompanying drawings, which are not necessarily drawn to scale, and wherein:

FIG. 1A shows a transducer assembly having a transducer array in accordance with some embodiments discussed herein;

FIG. 1B shows another transducer assembly having a transducer array in accordance with some embodiments discussed herein;

FIG. 2A shows an example plot of sonar return data using a conventional beamformer;

FIG. 2B shows an example plot of sonar return data in accordance with some embodiments discussed herein;

FIG. 3 shows a block diagram illustrating a sonar system in accordance with some embodiments discussed herein;

FIG. 4 shows another block diagram illustrating a sonar system in accordance with some embodiments discussed herein;

FIG. 5 shows a basic block diagram illustrating multiple sonar systems connected to a network in accordance with some embodiments discussed herein;

FIG. 6 shows a transducer housing mounted to a watercraft in accordance with some embodiments discussed herein;

FIG. 7 shows a perspective view of a watercraft with a plurality of receive beams formed in accordance with some embodiments discussed herein;

FIG. 8 shows a transmit beam emitted from a watercraft in accordance with some embodiments discussed herein;

FIGS. 9-11 show a plurality of transducer elements with multiple receive beams formed in accordance with some embodiments discussed herein;

FIG. 12 shows a side view of a watercraft with a receive beam being generated in accordance with some embodiments discussed herein;

FIG. 13 shows a top-down view of a watercraft with a plurality of receive beams being generated in accordance with some embodiments discussed herein;

FIG. 14 shows a side view of a watercraft with a plurality of receive beams being generated in accordance with some embodiments discussed herein;

FIG. 15 shows a perspective view of a watercraft with a plurality of receive beams being generated in accordance with some embodiments discussed herein;

FIG. 16 shows a plot of a plurality of shading windows in accordance with some embodiments discussed herein;

FIGS. 17A-17C show example clustering processes according to some embodiments discussed herein;

FIG. 18 shows another example clustering process according to some embodiments discussed herein;

FIG. 19 shows an example simplified transducer array receiving returns from a floor of a body of water according to some embodiments discussed herein;

FIG. 20 shows the transducer array of FIG. 19 having illustrated waves being received by the transducer elements in accordance with some embodiments discussed herein;

FIG. 21 shows a linear transposition of the two waves of FIG. 20 in accordance with some embodiments discussed herein;

FIG. 22 shows another example simplified transducer array receiving returns from a floor of a body of water according to some embodiments discussed herein;

FIG. 23 shows a 3D perspective view of a 3D mesh according to some embodiments discussed herein;

FIG. 24 shows an example 3D image of an underwater environment, in accordance with some embodiments discussed herein;

FIG. 25 shows an example 2D image of an underwater environment, in accordance with some embodiments discussed herein; and FIG. 26 illustrates an example method for adaptive beamforming in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

Sonar systems may transmit sonar waves into a body of water with a transmit transducer, a transmit/receive transducer, or similar device. When the sound waves strike anything of differing acoustic impedance (e.g., the sea floor or something suspended in the water above the bottom), the sound waves reflect off that object. These echoes or sonar returns may strike a sonar transducer or a separate sonar receiver, which converts the echoes back into an electrical signal which is processed by a processor (e.g., sonar signal processor 22 shown in FIGS. 3-4) and sent to a display (e.g., an LCD) mounted in the cabin or other convenient location in the boat. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment. In some embodiments, a more complex array may be used to generate a picture in a single sounding.

With reference to FIGS. 1A-1B, embodiments of the present invention may include a transducer array 100, 130 having multiple transducer elements 105 cooperating to receive sonar returns from the underwater environment. The transducer elements may be arranged in a grid in order to resolve a position of each of the received returns. In some embodiments, the transducer array 100 may include a single row of transducer elements 105 (e.g., linear or other two-dimensionally imaging array), as shown in FIG. 1A. In some further embodiments, the transducer array 130 may include multiple rows $105_A$, $105_B$, $105_C$ . . . $105_M$ of transducer elements 105 (e.g., a planar, curved, hemispherical, cylindrical, or other three-dimensionally imaging array) in a grid, with each row including a plurality of elements 105. As detailed herein, any number of transducer elements 105 may be used in the rows (e.g., rows $105_A$, $105_B$, $105_C$ . . . $105_M$) and/or columns (e.g., columns $105_1$, $105_2$, $105_3$ . . . $105_N$). In some embodiments, the transducer array 130 may be symmetrical (e.g., an N×N array), and in other embodiments, the transducer array may have uneven numbers of rows and columns (e.g., an M×N array). The plurality of rows $105_A$, $105_B$, $105_C$ . . . $105_M$ may be disposed adjacent to one another to form a plurality of columns $105_1$, $105_2$, $105_3$ . . . $105_N$ of transducer elements spanning the rows. Each of the respective rows or columns of transducer elements may be used to resolve an angle associated with the sonar returns. The respective angles determined by the plurality of rows and/or plurality of columns of transducer elements may be compared and combined to generate a two- or three-dimensional position of the sonar returns.

Embodiments of the present invention may process sonar returns from one or more of the rows (e.g., rows $105_A$, $105_B$, $105_C$ . . . $105_M$) and/or one or more of the columns (e.g., columns $105_1$, $105_2$, $105_3$ . . . $105_N$) using one or more adaptive beamforming techniques to form a plurality of sonar beams at a plurality of angles relative to the transducer array 100, 130 using minimal sonar pulses (e.g., a single pulse). Beamforming may involve generating a plurality of receive-beams at predetermined angles by spatially defining the beams from a set of sonar returns by phase shifting the sonar returns into one or more directions and detecting the distance of the sonar returns in each respective beam. In some embodiments, one or more predetermined shading windows may be applied to the sonar returns of each respective beam to reduce interference from undesired directions by minimizing the signal power while maintaining distortionless response in the intended beam direction. The predetermined shading windows may be pre-calculated to reduce the variation in computed windows and to increase the processing efficiency of the sonar system. In some further embodiments, a clustering technique may be used to further increase the efficiency of the system.

With reference to FIG. 2A, an example plot 190 of sonar return data using a conventional beamformer is shown. As explained in further detail below, the beamformer receives sonar returns at the transducer array, located at the origin 191 of the beam plot 190. The beamforming transducer may resolve targets 192, 193 in the underwater environment. FIG. 2B shows an example plot 195 from an adaptive beamformer according to embodiments discussed herein. As detailed below, the adaptive beamformer detailed herein may produce better images of the underwater environment than conventional beamformers (e.g., targets 197, 198 in the second beam plot 195 are clearer than the same targets 192, 193 as detected by a conventional beamformer 190).

Some further embodiments may include combination systems that include interferometric and beamforming techniques to determine multiple angles in a three-dimensional environment. Interferometry may involve determining the angle to a given sonar return via a phase difference between the returns received at two or more transducer elements. In some embodiments, the process of beamforming may be used in conjunction with the plurality of transducer elements to generate one or more angle values associated with each sonar return distance. Interferometric arrays may include minimally redundant spacing between transducer elements, while beamforming arrays may include redundant spacing.

Example System Architecture

FIG. 1A depicts an example transducer array 100 according to some embodiments discussed herein. The transducer array 100 may include a plurality of transducer elements 105 forming at least one row on a substrate 115 (e.g., a printed circuit board, PCB). Each of the transducer elements 105 may be configured to receive sonar pulses from an underwater environment. The returns from each transducer element 105 may then be processed based on the respective element's position in the grid of the array 100 to generate angle and range position data associated with the sonar returns, which may then be converted into two- or three-dimensional position data.

Turning to FIG. 1B, another example transducer array 130 is shown having a plurality of transducer elements 105 forming a plurality of rows $105_A$, $105_B$, $105_C$ . . . $105_M$ and a plurality of columns $105_1$, $105_2$, $105_3$ . . . 105N. In some embodiments, as detailed below, the transducer array 100, 130 may include any number of transducer elements (e.g., any integer number), such as the eight elements shown in FIGS. 1A-1B. In some embodiments, as many as sixty-four or more transducer elements may be included in a given row or column. In some embodiments, the transducer array 130 may include an equal number of rows $105_A$, $105_B$, $105_C$ . . . $105_M$ and columns $105_1$, $105_2$, $105_3$ . . . $105_N$ (e.g., where M=N). In some other embodiments, the transducer array may include more columns $105_1$, $105_2$, $105_3$ . . . $105_N$ (e.g., more elements in each row) than rows $105_A$, $105_B$, $105_C$ . . . 105M. Although some rows $105_A$, $105_B$, $105_C$ . . . $105_M$ may be shown in a horizontal orientation, the transducer array 100, 130 may be oriented at any desired configuration on or connected to a watercraft.

FIGS. 3-4 show a basic block diagram of a sonar system 20 capable for use with several embodiments of the present invention. As shown, the sonar system 20 may include a number of different modules or components, each of which may comprise any device or means embodied in either hardware, software, or a combination of hardware and software configured to perform one or more corresponding functions. For example, the sonar system 20 may include a sonar signal processor 22, a transceiver 24, and a transducer assembly 120. In some embodiments, the transceiver 24 may include a single transmit/receive component or separate transmit and receive components as detailed herein. In some embodiments, the transducer assembly 120 may include a transducer array 100. The sonar system 20 may further include a storage module 26 for storing sonar return data and other data associated with the sonar system in a non-transitory computer readable medium. The sonar system 20 may also include one or more communications modules 28 configured to communicate with one another in any of a number of different manners including, for example, via a network. In this regard, the communications module 28 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays 30 may be included in the sonar system 20. In some embodiments, one or more of the modules or components may be grouped into a sonar module 18. Additionally, in some embodiments, the sonar module 18 may be positioned within the transducer assembly 120.

With reference to FIG. 5, one or more sonar systems 20 may connect to external systems via the communications module 28. In this manner, the sonar system 20 may retrieve stored data from a remote, external server 40, 42 via a network 44 in addition to or as an alternative to the onboard storage module 26.

Referring back to FIG. 3, in some embodiments, the transducer array 100, 130 may be configured to transmit and receive sonar pulses. In some embodiments, one or more of the transducer elements 105 in the transducer assembly 120 may be configured to transmit sonar pulses. In some further embodiments, one or more transducer elements at or adjacent the center of the grid (e.g., in an M×N array, element M/2, N/2) may transmit sonar pulses. Any other element of the transducer array 100, 130 may additionally or alternatively be configured to transmit sonar pulses into the water. Referring to FIG. 4, in some embodiments, the transducer assembly 120 may include the transducer array 100, 130 and a separate transmit transducer 50 (e.g., transmit transducer 50 shown in FIG. 1B). The transmit transducer 50 may be disposed adjacent the transducer array 100, 130 or within the transducer array (e.g., between two or more transducer elements).

Turning to FIG. 6, an example watercraft 10 is shown having a housing 125 including a transducer assembly (e.g., the transducer assembly 120 shown in FIGS. 1A-1B) mounted in a downward and forward facing configuration. In the embodiment of FIG. 5, the housing 125 is mounted on the keel 12 of the watercraft 10; however, the housing or a separate transducer assembly may be mounted at any position on or off the center line of the watercraft. In some embodiments, the housing 125 may be mounted proximate the rear of the watercraft 10. The housing 125 may be oriented in substantially the same direction as the surface on which it is mounted; however, in other embodiments, the transducer array may be angled relative to the surface (e.g., a downward-facing version mounted proximate the front of the watercraft). In some embodiments, the housing 125 may be mounted forward of and/or above a planing water level, but below an idling or trolling water level, of the watercraft 10. In such embodiments, the housing 125 may be out of the water while the watercraft 10 is travelling at high speeds while remaining in the water when moving slowly.

Example Beamforming

As detailed herein, the transducer assembly (e.g., the transducer assembly 120 shown in FIGS. 1A-1B) may be configured to transmit sonar pulses into the water and receive sonar returns as detailed herein. In some embodiments, the return data from any two or more elements (e.g., the transducer elements 105 shown in FIGS. 1A-1B) may be combined using beamforming, to direct signal reception in one or more predetermined directions (e.g., a desired angle) relative to the watercraft. In some embodiments, one or more beams may be formed at one or more angles, which angles may lay in a plane of one or more rows of the transducer elements.

In some embodiments, a transmit transducer (e.g., transmit transducer 50 shown in FIG. 1B) may transmit one or more sonar pulses into the underwater environment. The transducer array (e.g., transducer array 100, 130 shown in FIGS. 1A-1B) may receive sonar returns from these one or more pulses during a short time period (e.g., less than the travel time of a second pulse to and from the floor of the underwater environment) and then computationally determine (e.g., via a sonar signal processor) a number of beams that represent sub-portions of the received sonar return data from different angles relative to the transducer array. The portions of the sonar returns falling within each computed beam may then be used to represent the distance to the sea floor or other object from which the returns emanate. Combining the returns, either two-dimensionally or three-dimensionally, from each of the generated beams then allows the sonar system to represent an image of the underwater environment. In three-dimensional embodiments, a plurality of planar beams may be formed spaced along a first orientation and a plurality of beams may be formed in the second orientation within each of the planar beams to form a grid of beams.

In some embodiments, the returns from a plurality of transducer elements may be processed via beamforming to generate distance data in each respective beam. For example, with reference to FIG. 7, a plurality of receive beams 205 are shown as 2D slices of sonar return data in a horizontal arrangement with respect to one another. As detailed below, these receive beams may be generated by one or more of the rows or columns of transducer elements forming a sub-array (e.g., the transducer elements 105 shown in FIGS. 1A-1B). The beams may be formed in any orientation including substantially horizontally (e.g., the horizontally arranged beams 205 shown in FIG. 7), vertically (e.g., the vertically arranged beams shown in FIG. 14), both horizontally and vertically, or at another angle. Moreover the beamforming sub-array may be oriented in any direction including down, forward, backward, to either side, or combinations thereof.

With reference to FIG. 8, a single transmit beam 210 may be used to ensonify a wide area of the underwater environment and one or more of the receive transducer elements (e.g., the transducer elements 105 shown in FIGS. 1A-1B) may receive sonar returns from the transmitted sonar pulses. In some embodiments, each of the transducer elements (e.g., the transducer elements 105 shown in FIGS. 1A-1B) may receive sonar returns from the same transmitted sonar pulses. In some embodiments, the transmit transducer may be one or more of the transducer elements (e.g., the transducer elements 105 shown in FIGS. 1A-1B) in the transducer array (e.g., the arrays 100, 130 shown in FIGS. 1A-1B). In some embodiments, the transducer array 100, 130 may be configured to receive sonar returns with each element 105 from a single sonar pulse transmission.

Turning back to FIGS. 1A-1B, beamforming may be performed with an array of transducer elements 105. In some embodiments a linear or curved row of transducer elements (e.g., one or more rows $105_A$, $105_B$, $105_C$ ... $105_M$ or columns $105_1$, $105_2$, $105_3$ ... $105_N$) may be configured to process received sonar return data in separate "beams" by considering the sonar return data received from different angles relative to the array 100. In some embodiments, the sonar return data may be received by the transducer elements from a single pulse or series of pulses from the transmit beam, such that each of the beams (e.g., the beams 205 shown in FIG. 7) may be generated substantially simultaneously via processing based upon the sonar returns received from a single pulse or set of pulses, rather than waiting for multiple sets of sonar pulses to traverse the distance from the watercraft to a reflected surface and back.

Beamforming may form each beam by generating a subset of data from the sonar return data that is formed (e.g., oriented) in a desired direction. For example, a first beam oriented in a first direction may be created by forming the sonar return data in the first direction to generate first beam data associated with the first beam (e.g., the first beam data may be representative of sonar returns received through a beam oriented in that corresponding direction).

With reference to FIGS. 9-11, an example transducer sub-array including a plurality of transducer elements 171, 172, 173 is shown. As shown, the plurality of transducer elements 171, 172, 173 of FIGS. 9-11 are demonstrative of the operation of the transducer elements 105 shown in FIGS. 1A-1B. In the embodiment shown in FIGS. 9-11, three receive beams 214, 216, 218 may be formed at angles $\alpha_1$, $\alpha_2$, and $\alpha_3$, respectively. Each of the receive beams 214, 216, 218 may define substantially the same beamwidth, and beams may be formed at any angle within the receive area of the transducer elements. In some embodiments, the receive beams 214, 216, 218 may define different beamwidths. As detailed herein, the transducer elements 171, 172, 173 may receive sonar returns from every angle (e.g., $\alpha_1$, $\alpha_2$, and $\alpha_3$) substantially simultaneously (e.g., during a single receive cycle from one transmitted pulse) and generate the receive beam data via processing.

The sonar returns received by each transducer element 171, 172, 173 may be processed via a sliding Discrete Fourier Transform to calculate a complex DFT value for the frequency bin which contains the return of interest (e.g., the instantaneous amplitude and phase of the returns from the sonar pulses). In some embodiments, a Fast Fourier Transform may be used. In an embodiment where $\alpha_2$ is 90 degrees (e.g., 0 degrees relative to a perpendicular receive direction of the transducer elements), the data from each channel is summed together to form a beam at $\alpha_2$. To form a beam at $\alpha_1$, the returns received at each transducer element 171, 172, 173 may be aligned. For example, a return originating from $\alpha_1$ may first arrive at the leftmost transducer element 171, then at the center transducer element 172, and finally at the rightmost transducer element 173. Once the sonar return data is in the frequency domain (e.g., after the DFT or FFT), the beam may be formed at the desired angle (e.g., $\alpha_1$) by multiplying the data received at the elements by a respective complex value to shift the phase of the return data received at each element to computationally align the array with the desired direction. The collection of complex values that adjust (e.g., form) the beam in a given direction may be referred to as a "steering vector" as detailed below. For example, in the embodiment shown in FIG. 9, the phase of the data received by leftmost transducer element 171 and the center transducer element 172 may be shifted to align with the rightmost transducer element 173. The sonar return data from the rightmost element 173 and center element 172 may alternatively be shifted to align with the leftmost element 171, or the data from the outermost transducer elements 171, 173 may be shifted to align with the center element 172. The three channels corresponding to the three transducer elements 171, 172, 173 may then be summed together to generate a receive beam at $\alpha_1$.

In some embodiments, the beams may be formed in the time domain. For example, to align the channels in FIG. 9, the leftmost transducer element 171 may be delayed by a predetermined number of samples (e.g., two samples) and the center transducer element 172 may be delayed by a second predetermined number of samples (e.g., one sample). The three channels corresponding to the three transducer elements 171, 172, 173 may then be summed together to generate a receive beam at $\alpha_1$.

Similarly, to form a beam at $\alpha_3$, the returns received at each transducer element 171, 172, 173 may be aligned at $\alpha_3$. For example, a return originating from $\alpha_3$ may first arrive at the rightmost transducer element 173, then at the center transducer element 172, and finally at the leftmost transducer element 171. To align the channels in the time domain, the rightmost transducer element 173 may be delayed by a predetermined number of samples (e.g., two samples) and the center transducer element 172 may be delayed by a second predetermined number of samples (e.g., one sample), with the leftmost transducer element 171 receiving no delay. Similarly, to align the channels in the frequency domain, the phase of the sonar return data from the rightmost transducer element 173 and center transducer element 172 may be shift to align with the leftmost transducer element 173. The sonar return data from the leftmost element 171 and center element 172 may alternatively be shifted to align with the rightmost element 173, or the data from the outermost beams 171, 173 may be shifted to align with the center element. The three channels corresponding to the three transducer elements 171, 172, 173 may then be summed together to generate a receive beam at $\alpha_3$.

The sonar return data may be formed into a plurality of beams by applying a phase shift to one or more of the channels to form a beam (e.g., represented by beam data) in a given direction. For example, the first receive beam 214, shown in FIG. 9, may align the received returns 215 at the first angle $\alpha_1$ as detailed above. Similarly, the second 216 and third 218 receive beams shown in FIGS. 10-11 may align the received returns 217, 219 at the second angle $\alpha_2$, and third angle $\alpha_3$, respectively. In some embodiments, the steering vectors, representing a set of complex values, may be applied to the channels (e.g., data from each transducer element 171, 172, 173) to cause a phase shift when multiplied by the respective channels' complex DFT output. The steering vectors may phase align each channel to a particular physical angle (e.g., one of the first angle $\alpha_1$, second angle $\alpha_2$, and third angle $\alpha_3$) based on the necessary time delay between the transducer elements 171, 172, 173. Based on the predetermined distance between each of the transducer elements, the delay of each transducer element's received samples may form a beam at a given phase difference between the transducer elements. An example equation for a linear steering vector in accordance with some embodiments is shown in Equation (1) below. $V_s$ represents a steering vector and i references the $i^{th}$ transducer element, where it has one element for each element in the array. The $i^{th}$ element of the variable $d_{pc}$ is the distance from the $i^{th}$ array element to a phase center of the array. The variable $\alpha_k$ is the angle of the $k^{th}$ beam, and c is the speed of sound in water. In some further embodiments, the steering vector may account for non-uniform arrays or may include three-dimensional steering.

$$V_{S_i} = e^{2j\pi \frac{d p c_i}{c} \sin \alpha_k} \qquad (1)$$

Although the example of FIGS. 9-11 depict three transducer elements 171, 172, 173, any number of transducer elements may be used in a similar manner to form any number of receive beams. In some embodiments, the transducer elements may form greater than the number of transducer elements in a beamforming sub-array using one or more adaptive techniques. In some other embodiments, the number of receive beams may be equal to the number of transducer elements in a beamforming sub-array. In yet some other embodiments, the number of receive beams may be less than the number of transducer elements in a beamforming sub-array. In some embodiments, the receive beam angles $\alpha_1$, $\alpha_2$, and $\alpha_3$, may be defined symmetrically about a centerline of the transducer sub-array (e.g., 0 degrees relative to a perpendicular receive direction of the transducer elements). In some embodiments, the receive beams may be generated at least one degree apart.

In some embodiments, the beams and beam data may represent a subset of return data having a narrow width in a plane parallel with the row or column of transducer elements (e.g., the plane of the paper in FIGS. 9-11) and a wide width perpendicular to the row or column of transducer elements (e.g., perpendicular to the plane of the paper in FIGS. 9-11). For example, with reference to FIG. 12, one or more formed beams 205 may be configured to span vertically from near the surface of the body of water to a vertical or near vertical direction down. With reference to FIG. 13, the beams 205 may be narrower in a forming direction, in this instance a horizontal direction, in which the beams are formed. In the embodiments of FIGS. 12 and 13, the horizontally oriented transducer elements (e.g., one or more horizontal transducer elements 105 shown in FIGS. 1A-1B) may perform beamforming, such that the beams 205 may be formed in portions of the horizontal dimension (e.g., an azimuthial dimension). The horizontal arrangement may refer to a straight or curved axis spanning the transducer elements, such that the receiving surfaces of the transducer elements may still be pointed at an incline relative to an absolutely horizontal plane while being arranged in the horizontal plane.

Turning to FIG. 14, in some embodiments, the beamforming transducer elements may additionally or alternatively be arranged vertically such that the narrower, forming direction of the beams 305 is oriented horizontally. In such embodiments, each beam 305 may have a wide beamwidth across a full horizontal receive dimension of the transducer elements (e.g., the transducer elements 105 shown in FIGS. 1A-1B) and a narrow beamwidth in the vertical, forming direction.

Moreover, three dimensional sonar data may be produced by combining beamforming in a first orientation with beamforming in a second orientation. For example, beamforming may first be used to form a plurality of planar beams (e.g., beams 205 shown in FIG. 7) in a first orientation (e.g., horizontal in the embodiment of FIG. 7), and within each planar beam, a second plurality of beams (e.g., vertical beams 305 shown in FIG. 14) may be formed within each of the first plurality of beams to generate a three-dimensional grid of beams. With reference to FIG. 15, the vertically arranged beams 305 of FIG. 14 are shown formed within each of the horizontally arranged beams 205 of FIG. 7. The resultant grid of beams may produce sonar return data in each of a plurality of tapered rectangular or ellipsoid segments (e.g., cones) of the underwater environment. Each segment (e.g., cone) of sonar return data (e.g., each respective set of beam data) in each beam may represent one or more points of position data, which, when combined, produce a 2D or 3D point cloud of sonar return data. Each of the points of data in each of segments may be combined to produce an image of the underwater environment as detailed below. In some embodiments, three-dimensional beams may be directly formed with 3D steering vectors, which form a grid of beams rather than separately forming horizontal and vertical beams. In some embodiments, as detailed below, beamforming may be used in one direction (e.g., a horizontal or vertical direction) and other processing techniques, such as interferometry, may be used within each formed beam in the other direction. In some embodiments, the beams may have a one degree resolution, such that each formed beam may be one degree different from adjacent beams.

Although embodiments detailed herein show the formed beams 205, 305 directly abutting one another, the beams may be formed in any configuration such that the beams overlap, directly abut, or are spaced from one another. As shown in FIGS. 9-11, the beams may naturally overlap at close distances to the transducer elements 105 as each of the transducer elements is arranged in the forming direction Turning back to FIGS. 1A-1B, the transducer array 100, 130 may use beamforming in any direction. For example, the transducer elements 105 in one or more of the rows $105_A$, $105_B$, $105_C$ . . . $105_M$ may be used for beamforming, such that each row may be configured to generate a plurality of receive beams (e.g., the beams 205, 305 shown in FIGS. 10 and 15-17). In some embodiments, as detailed herein, the rows $105_A$, $105_B$, $105_C$ . . . $105_M$ may be oriented in any direction (e.g., horizontally, perpendicular to centerline of the watercraft, vertically, parallel to the centerline of the watercraft, or any other direction) such that the beams may be formed in a desired direction. Similarly, the columns $105_1$, $105_2$, $105_3$ . . . $105_N$ may be used for beamforming, such that each column may be configured to generate a plurality of receive beams (e.g., the beams 205, 305 shown in FIGS. 10 and 15-17). In some embodiments, as detailed herein, the columns $105_1$, $105_2$, $105_3$ . . . $105_N$ may be oriented in any direction (e.g., horizontally, perpendicular to centerline of the watercraft, vertically, parallel to the centerline of the watercraft, or any other direction) such that the beams may be formed in a desired direction. In some further embodiments, a diagonal series of transducer elements may be used for beamforming. The grid of the transducer array 130, including rows (e.g., rows $105_A$, $105_B$, $105_C$ . . . $105_M$ shown in FIG. 1B) and columns (e.g., columns $105_1$, $105_2$, $105_3$ . . . $105_N$ shown in FIG. 1B) of transducer elements 105, may be used collectively to form beams in three dimensions by producing substantially planar beams (e.g., 2D slices of sonar return data) with one (e.g., one of the rows or columns) forming sub-beams within each planar beam in the other. The combined imaging of an N×N or M×N transducer array (e.g., transducer array 130 shown in FIG. 1B) may allow the sonar system to generate three-dimensional images with beamforming.

In some embodiments, two or more transducer elements may be used in a beamforming configuration (e.g., one or more of the rows $105_A$, $105_B$, $105_C$ . . . $105_M$ or columns $105_1$, $105_2$, $105_3$ . . . $105_N$). In some embodiments, a large number of transducer elements may be used in the beamforming configuration. For example, as many as sixty four or more transducer elements may be used in a beamforming configuration. In some embodiments, eight or more transducer elements may be used in a beamforming configuration. In some embodiments, thirty two or fewer transducer elements may be used in a beamforming configuration.

With continued reference to FIG. 1B, any or all of the rows $105_A$, $105_B$, $105_C$ ... $105_M$ or columns $105_1$, $105_2$, $105_3$ ... $105_N$ may have a large number of transducer elements. Each transducer element added to an array or configuration of transducer elements creates an additional null (e.g., point in the beam pattern that receives no signal) in the beam pattern of the transducer elements. Each null may be moved or tuned via beamforming to reduce interference as detailed below. As such, having a large number of nulls may allow for better resolution of the underwater environment. As detailed herein, although FIG. 1B depicts 3 rows $105_A$, $105_B$, $105_C$ ... $105_M$ each having eight transducer elements 105, any number of rows and columns (e.g., elements per row) may be used.

In some embodiments, the subsets of sonar return data from the 2D slices of each planar beam are saved in memory for processing to form 3D sonar return data, which may be displayed as a 3D image. In some embodiments 3D sonar return data representing a 3D image may be stored in a buffer prior to or in conjunction with display on the screen. The 3D image may be formed as a 3D mesh of connected points, as detailed below, or may be further processed into a textured 3D image. The position of the sonar returns within the underwater environment may be represented as two- or three-dimensional coordinates with respect to the boat, housing or other reference point, or may alternatively be represented as a distance and angle from the reference point. In yet another embodiment, the position may be determined as an absolute position value by comparing the interferometric data with GPS or other positioning data.

Example Adaptive Beamforming

During beamforming, one or more of the beams may be adaptively processed to reduce interference outside an intended direction of the beam to form weighted sonar return data. As detailed herein, one or more predetermined shading windows may be applied to the sonar return data for each generated beam. The predetermined shading windows may be pre-calculated before, at least, initiation of the beamforming process by either the sonar system (e.g., using the sonar return processor) itself or by a separate, external system (e.g., a manufacturer's computer), and the shading windows may be used to reduce interference (e.g., weight the return data) outside the beam's primary direction (e.g., the angle at which the beam is formed by the steering vectors), while maintaining unit gain in and around the primary direction. Interference may be reduced, for example, by steering the nulls of the beam pattern onto one or more interferers, as described herein. In some embodiments, the sonar system (e.g., via the sonar signal processor) may test a plurality of predetermined windows or clusters of predetermined windows to determine an ideal window for each of the beams. As detailed below, the ideal window may be determined by minimizing the signal power or variance of the resulting beam.

Adaptive beamforming operates by superimposing waves (e.g., windows) onto sonar return data to constructively or destructively shape the sonar return data into a final beam. Embodiments of the adaptive beamforming system may calculate a set of shading windows to destructively reduce signal from an undesired direction (e.g., interferers) and/or constructively emphasize returns from a desired direction by respectively minimizing or maximizing one or more parameters of the sonar returns to produce weighted sonar return data. In some embodiments, the sonar system may receive sonar returns from the desired direction (e.g., the primary direction of a given beam) without distortion by applying a unit gain in this target direction. The unit gain may set the amplitude of the shading windows at zero in the primary direction to ensure that the sonar returns are not altered or distorted (e.g., as shown at point 175 in FIG. 16).

In some sonar systems, an optimal set of shading windows may be calculated to minimize the beam power (e.g., minimum variance). For example, a Minimum Variance Distortionless Response (MVDR) beamformer estimates the sonar environment's covariance matrix to compute shading windows for each beam in real time. However, current adaptive beamformers require substantial processing power to generate beams, and require additional processing to ensure that the beams are robust. Moreover, adaptive beamformers with insufficient robustness may inadvertently create distortion in the beam by cancelling sonar returns in the beam's primary direction, known as own signal cancelation. For example, the practice of calculating the covariance matrix R and its inverse and ensuring that R is non-singular requires substantial smoothing of the outer-product of the instantaneous array inputs. While theoretically an MVDR beamformer produces a sufficient estimate of the covariance matrix R, these calculations introduce a lag into the estimate of R, which for real-time or near real-time systems may cause mismatch in the estimated covariance matrix and the true value of R. These effects could cause own-signal cancellation, poor attenuation of interferers, or both. As such, traditional adaptive beamformers may be inapplicable for sonar systems that require fast, efficient processing.

Moreover, using a Cholesky factorization, for example, in MVDR beamforming to calculate the inverse would require a number of multiplications on the order of $$\frac{5}{6}N^3$$

complex multiplications, where N is the number of elements being used to form the beams. Calculating the final weighting window would require an additional N complex multiplies, an additional N−1 complex additions, and an additional N complex divisions for each formed beam. Each beam then requires a further N complex multiplies and N−1 complex additions. Traditional adaptive beamformers, therefore, involve significant computational complexity while having poor performance if not coupled with a robust processing system and beamforming algorithm. In contrast to traditional adaptive beamformers, embodiments of the adaptive beamformer detailed herein may include MN complex multiplies and M(N−1) complex additions for each beam, where M represents the number of windows compared.

As detailed above with reference to FIG. 2A, an example plot 190 of sonar return data using a conventional beamformer is shown. The beamforming transducer may resolve targets 192, 193 in the underwater environment; however, the targets 192, 193 are shown as large, undefined points on the plot 190. FIG. 2B shows an example plot 195 from an adaptive beamformer according to embodiments discussed herein. The beam plot 195 also detects targets 197, 198 using a transducer array positioned at the origin 196. Comparing the conventional beam plot 190 with the beam plot 195 according to some embodiments disclosed herein, targets 197, 198 in the second beam plot 195 are clearer and better defined than the same targets 192, 193 as detected by a conventional beamformer 190.

Some embodiments detailed herein may produce comparable results to an optimal MVDR beamformer, while significantly reducing the computational complexity and reducing own signal cancellation for the beamforming process. In some embodiments, the predetermined shading windows selected will be based on prior experience with optimal weights generated in various example environments. In this manner, numerous ideal windows may be calculated for many types of underwater environments, and a set of predetermined windows may be generated for the sonar system to maximize system's options for reducing interference. For example, a Hamming window, a Hanning window, a Blackman window, a Taylor window, or a Kaizer window may be used as one or more of the predetermined windows. The inverse of any of these windows may also be used, and these inverse windows may generate comparably narrow main lobes. One example of a Hamming window is included below as Equation (2), where N represents the width, in samples, of the window function (e.g., $0 \leq l \leq N-1$).

$$W(l) = 0.54 - 0.46\cos\left(\frac{2\pi l}{N-1}\right) \quad (2)$$

An example Hanning window is included below as Equation (3):

$$W(l) = 0.5\left[1 - \cos\left(\frac{2\pi l}{N-1}\right)\right] \quad (3)$$

In some embodiments, one or more symmetric windows may be included in the set of predetermined windows. Symmetric windows may be aligned with and symmetric about the primary direction of the beam. In some embodiments, one or more windows may be slightly steered to either side of the primary direction of the beam. In some embodiments a mix of symmetric windows, and offset windows may be used. Offset windows may be centered to one side of the primary direction of the window, and in some embodiments, the offset may be smaller than the width of the main lobe, such that nulls are not positioned in the primary direction. In some embodiments, the beams may include a uniform distribution of nulls on either side of the primary beam direction. In some other embodiments, more nulls may be formed on one side. In some embodiments, each window may be divided by the sum of its component coefficients to ensure that the distortionless response criteria are satisfied.

The shading windows may be used to position the nulls of the beam pattern at various predetermined positions for reducing interference, and the windows may be pre-calculated to avoid steering the nulls onto the main lobe of the beam. In some embodiments, separate windows may be used for each receive beam to also form the beam in the desired direction. In some other embodiments, the steering vectors may be used to steer the beam in the desired direction and the windows may position the nulls. The selected window for a given beam may be, for example, the beam with the most optimal null placement.

With reference to FIG. 16, each of the windows 170 may be pre-selected to include a gap 180 in the nulls around the primary angle (e.g., shown where the "look angle" equals 0 degrees) to prevent own signal cancellation. As detailed above, the steering vectors may determine the ultimate direction of the beam (e.g., positioning the "0 degree" mark at a desired position in the underwater environment), while the windows shade or otherwise weight the beam around this direction (e.g., each window may be applied with the steering vectors such that "0 degrees" as shown in FIG. 16 represents the direction of the given beam). As also shown in FIG. 16, each of the windows may be selected to provide unit gain (e.g., 0 dB) at the primary direction (e.g., each of the predetermined windows may converge at the point 175 having 0 dB gain and a 0 degree look angle). After selecting the predetermined windows, one or more of the windows may be applied to the received sonar return data to identify an ideal window for each formed beam. The orientations and angles of each of the formed beams may be selected by a user, determined dynamically during operation, or predetermined by a manufacturer or programmer. In some embodiments, the sonar signal processor may then form each beam at each of the angles (e.g., as detailed above with respect to FIGS. 9-11) and calculate which of the predetermined windows performs best by maximizing interference reduction while maintaining distortionless response in the primary direction (e.g., the angle) of each beam.

The ideal window for each beam may be calculated by minimizing the signal power of the sonar return data in each beam. More generally, in some embodiments, the variance may be minimized in each beam by estimating the variance of each beam and maintaining a running average of the power for each beam. Because each predetermined window may be pre-selected to have a gap (e.g., gap 180 shown in FIG. 16) in the nulls and a unit gain (e.g., point 175 shown in FIG. 16) in the primary direction of the beam, minimizing the signal power may then minimize the interference from other directions. Said differently, because the predetermined windows have a distortionless response in the desired direction, any distortion (e.g., via destructive interference) may occur in the return outside the angle of the beam. By reducing the returns received outside the angle of the beam, interference and unwanted noise will be reduced. As such, minimizing the signal power of the beams created using the predetermined windows may thereby determine the ideal window.

The signal power of a beam may be represented as the squared value of the magnitude or amplitude of the beam. For example, the amplitude of a beam may be defined by the following Equation (4), in which B represents the beam, m is the index to the $m^{th}$ of M beams, W represents the predetermined shading windows, l is the $l^{th}$ of L predefined shading windows, t is the current sample index, V is a steering vector for the beam, H denotes the Hermitian transpose, and ∘ represents the Hadamard product:

$$B_m(t) = (W_l \circ V_{s_m})^H X(t) \quad (4)$$

Accordingly, the signal power of beam, $B_m(t)$ may be represented by Equation (5):

$$|B_m(t)|^2 = |(W_l \circ V_{s_m})^H X(t)|^2 \quad (5)$$

To minimize the signal power of the beam, one may then apply each of the predetermined windows until the predetermined window producing the minimum signal power is determined, as shown in Equations (6) and (7), in which E{ } is the expected value operator, K is the number of ping beam powers to average:

$$\min E\{|B_m(t)|^2\} = \min_l \{|(W_l \cdot V_{s_m})^H X(t)|^2\} \quad (6)$$

$$\min E\{|B_m(t)|^2\} \approx \min_l \frac{1}{K} \sum_{K=0}^{K-1} |(W_l \cdot V_{s_m})^H X(t)|^2 \quad (7)$$

After each of the ideal (e.g., minimized) predetermined windows is determined for each beam, the beam power may then be defined by Equation (8):

$$|B_m(t)|^2 = |(W_{l_{min_m}} \cdot V_{s_m})^H X(t)|^2 \quad (8)$$

As detailed herein, each beam may have an independently-determined shading window, which may be different than or the same as other shading windows for other beams. In some other embodiments, two or more beams may include the same predetermined shading window to reduce processing requirements. In some embodiments, the same set of predetermined shading windows may be applied to each beam. From the predetermined set, each beam may have an independently-determined shading window.

In some alternative embodiments, different sets of predetermined shading windows may be applied to two or more of the respective beams. The sets of predetermined shading windows tested for a given beam may be based upon the location of the beam in the overall beam pattern. For example, beams closer to the exterior of the beam pattern (e.g., angled farther from a normal vector to the center of the transducer array) may include greater interference reduction windows, while beams closer to the interior of the beam pattern may include a greater number of more-nuanced, main lobe-defining windows.

As detailed above, beams may be separately formed in a first orientation (e.g., horizontally or vertically oriented planar beams) via a first set of steering vectors and then in the second, remaining orientation via a second set of steering vectors to form beams in three dimensions. In some alternative embodiments, the beams may be formed in three dimensions by a single, 3D steering vector. Each formed beam may have a window separately applied to it via the beamforming processes described herein. Said differently, in two-part beamforming embodiments, the first set of beams formed by the first steering vectors may then apply predetermined windows to each beam. Once the final beam is formed in the first orientation, the second set of steering vectors may be applied and a second set of predetermined windows may be applied within each first formed beam. For three-dimensionally formed beams, a single, three-dimensional window may be applied or two, two-dimensional windows may be applied. In some embodiments, windows may be selectively applied in one or more directions, such that a user or the device may turn off the windows in one or more dimensions (e.g., horizontally and/or vertically).

In some embodiments, the above referenced testing of the sets of predetermined windows for each beam may further include clustering each window into representative groups to more efficiently test and process each window. For example, windows may be grouped by their relative similarity, such as total null count, amplitude of the side lobes, width of the main lobe, etc. By grouping the windows into sub-groups, a tiered testing process may be applied for each beam. Tiered testing by clustered groups may reduce processing time and increase the efficiency of the sonar system by allowing multiple predetermined windows to be disregarded with a single test. During tiered testing, the groups may be considered, as a whole, to determine which group best minimizes the signal power of the given beam. Once a group is chosen, each of the windows or sub-groups within that group may then be tested to further narrow the possible windows, as detailed above.

In some embodiments, clusters of windows may be tested by generating a representative window to reflect the characteristics of the cluster. The representative window may be, for example, an average of the windows within the cluster. In some embodiments, a representative window may be tested alongside the constituent windows of the cluster, and the representative window may be selected if it minimizes the signal power. Said differently, the representative window may be added as a member of the cluster and tested along with the individual window in the cluster as detailed herein. The representative window may be generated by the sonar system (e.g., using the sonar signal processor) or may be predetermined by the manufacturer.

The clusters may be calculated by grouping similar windows into sub-groups. For example, a K-means clustering algorithm may be used to divide the windows into clusters. In some embodiments, windows may be randomly assigned to clusters and the clusters may be refined by moving windows between clusters by comparing each window to its cluster. For example, after random clustering, the centroid of the windows in each cluster may be determined by taking the average of the windows in a given cluster. The average may be used to generate the representative window for each cluster. Each window in the cluster may then be compared to the respective representative window of the cluster, for example, by taking the Euclidean distance between each window and the representative window. Windows farthest from the representative window may be reassigned to clusters having more similar characteristics. The clusters may be generated through an iterative process of averaging the windows in a cluster, finding the window or windows farthest from the representative window of each cluster, and reassigning these windows to a more representative cluster (e.g., to a cluster with the smallest Euclidean distance between the representative window and the moved window). In some embodiments, one window may be moved in each iteration, and in some further embodiments, two, three, four, five, or any other number of windows may be moved in each iteration. The final clusters after a predetermined number of iterations may be used in the beamforming systems detailed herein.

In some further embodiments, the clusters may be further processed to even the number of windows in each cluster. In some embodiments, the clustering process may produce uneven clusters with different numbers of windows in each cluster. In some embodiments, the clusters may force a predetermined maximum number of windows in each cluster and redistribute the remaining windows to other clusters. For example, a cascading clustering system may be used starting with the largest cluster and redistributing the windows with the greatest Euclidean distance with respect to the representative window (e.g., the least similar windows of the largest cluster) to leave the maximum number of windows in the cluster. The redistribution process may then be "cascaded" down to the next largest cluster, similarly moving all but the predetermined maximum number of windows to the most representative cluster. In some embodiments, the clusters which have already been redistributed may not receive additional windows from the remaining clusters to preserve the maximum number of windows in each cluster. Thus, in such embodiments, the final cluster in the redistribution process may have the maximum number of windows (e.g., the same number as the remaining clusters) and will not redistribute any windows. This cluster-generation process may be performed locally by the sonar signal processor and/or remotely in a network (e.g., by a third party system 42 in the network 44 shown in FIG. 5)

Once the clusters are generated, the sonar signal processor may test each of the clusters and/or windows for each formed beam. With reference to FIG. 17A, two clusters 400, 402 may be tested. Each of the clusters 400, 402 may represent two or more windows 404, 406, 408, 410, 412, 414. The testing methods detailed herein may be applied to Cluster 1 400 and Cluster 2 402 to minimize the signal power between the two clusters. Turning to FIG. 17B, in an embodiment in which Cluster 1 400 generates a lower signal power than Cluster 2 402, the windows (e.g., Window A 404, Window B 406, and Window C 408) of Cluster 1 may then be tested to determine which window within Cluster 1 minimizes the signal power of the current beam. FIG. 17C represents an embodiment in which Window A 404 is the ideal window that minimizes the signal power of the beam being tested when compared with the remaining windows and clusters.

In some embodiments, each cluster may include half of the total number of windows being tested. In some embodiments, the number of clusters tested, and the number of windows in each cluster, may depend upon the total number of comparisons that the system may perform. For example, if a non-clustered adaptive beamformer as detailed above tests Q windows, a clustering system may include Q/2 clusters, each having Q/2 windows, for a total of Q tests to be performed during the window power minimization process. In some embodiments, the clusters may be grouped in any manner that allows for Q comparisons to be performed, including multiple layers of clusters, and any number of clusters or windows in each layer, as detailed below.

In some embodiments, the windows may be grouped into any number of sub-groups. For example, FIG. 18 shows an embodiment in which Cluster 1 416 includes sub-Cluster 1,A 420 and sub-Cluster 1,B 422, and Cluster 2 418 includes sub-Cluster 2,A 424 and sub-Cluster 2,B 426. Each of these sub-clusters may then include further sub-clusters or may include shading windows (e.g., windows 428, 430, 432, 434, 436, 438, 440, or 442). Each level of clusters or windows may be processed to determine which minimizes the signal power of the currently tested beam.

While each cluster is shown having the same number of sub-clusters and windows, any number of clusters or windows may be used and any number of layers (e.g., layers 444, 446, and 448 shown in FIG. 18) of sub-clusters may be used within a given cluster. For example, in some embodiments, each layer of testing may include only two clusters, and may allow the sonar signal processor to eliminate 50% of the possible windows with each test. In such embodiments, windows may be forced into clusters or predetermined to form paired clusters to facilitate the binary testing process.

In some embodiments, more than two clusters or windows may be tested at a time. In some embodiments the clusters may be formed less rigidly, such that only windows that are sufficiently related may be clustered. These clustering techniques may include more robust criteria and may only cluster windows that are sufficiently representative of (or similar with) one another.

In such embodiments, any number of clusters or windows may be considered at a time (e.g., within the same layer of testing). For example, windows which are not similar to any other window may be tested separately alongside the remaining clusters or sub-clusters in a given layer. In some embodiments, clusters may include different numbers of sub-clusters and/or windows. For example, one cluster may represent thirty-two windows, while another cluster may represent eight. In some embodiments, each cluster or sub-cluster may include at least two windows.

Similarly to window testing, clusters or sub-clusters may be the same between two or more beams or different between two or more beams. In either embodiment, the final windows may be selected independently for each beam by minimizing the signal power of each beam. In some alternative embodiments, a window may be selected for two or more beams simultaneously (e.g., where the sonar returns for each beam are similar).

As detailed above, any number of windows may be tested for any number of beams. For example, as many as sixty-four or more beams may be formed. In some embodiments, ten, twenty, thirty, forty, fifty, seventy-five, or one hundred windows may be tested for each beam. In some embodiments, as also detailed above, the same windows may be tested for two or more of the beams, or all of the beams. In some other embodiments, different windows may be tested for two or more of the beams, or all of the beams. In some embodiments, ninety or more beams may be used.

Predetermined shading windows may be used simultaneous with or in series with steering vectors to produce a beam. In some embodiments, the shading windows and steering vectors may be predetermined together as a single computational feature. Predetermined windows may allow for controlled selection of windows (e.g., pre-calculation to avoid own signal cancellation and extraneous results) while freeing processing power to increase the efficiency and/or reduce the cost and power consumption of the sonar system.

With reference to FIG. 26, an example method for adaptive beamforming is shown. In some embodiments, a transducer array may receive sonar returns from a sonar pulse transmitted into an underwater environment 2500. The transducer array may include at least two transducer elements. The sound energy of the sonar returns may be converted into sonar return data 2505. The method may include generating first beam data associated with a first beam based upon the sonar return data 2510. While the first beam may be formed in a first direction, the process of beamforming may be repeated as desired to form a plurality of beams in a plurality of directions. Generating the first beam data 2510 may include several steps. For example, generating the first beam data may include forming the sonar return data in the first direction 2515 (e.g., applying a steering vector). The generation process may further include applying a first predetermined window to the sonar return data to define a first weighted return 2520, and may include applying a second predetermined window to the sonar return data to define a second weighted return data 2525. Any number of additional windows may be applied as detailed herein. The generation process may compare the first power of the first weighted return data to the second power of the second weighted return data 2530, and the process may define, in an instance in which the first power is less than the second power, the first beam data based upon the first weighted return data (e.g., the predetermined window which minimizes signal power).

In some embodiments, as detailed herein, the example method may include generating a second beam data associated with a second beam based on the sonar return data. The second beam may define at least one second main lobe oriented in a second direction. The second beam data may be generated similar to the first beam data, for example, by forming the sonar return data in the second direction; applying a third predetermined window to the sonar return data to define a third weighted return data; applying a fourth predetermined window to the sonar return data to define a fourth weighted return data; comparing a third power of the third weighted return data to a fourth power of the fourth weighted return data; and defining, in an instance in which the third power is less than the fourth power, the second beam data based upon the third weighted return data.

In some embodiments, as detailed herein, the first predetermined window may define an average of a first plurality of predetermined windows. In such embodiments, the first plurality of predetermined windows may include at least a fifth predetermined window and a sixth predetermined window. The method may further include, for example, applying the fifth predetermined window to the sonar return data to define a fifth weighted return data; applying the sixth predetermined window to the sonar return data to define a sixth weighted return data; comparing a fifth power of the fifth weighted return data to a sixth power of the sixth weighted return data; and in an instance in which the fifth power is less than the sixth power, defining the first beam data based upon the first weighted return data further comprises defining the first beam data based upon the fifth weighted return data Example Interferometry As detailed herein, the transducer assembly (e.g., the transducer assembly 120 shown in FIGS. 1A-1B) may be configured to transmit sonar pulses into the water and receive sonar returns as detailed herein. In some embodiments, the return data from any two or more elements (e.g., the transducer elements 105 shown in FIGS. 1A-1B) may be compared via interferometry, to determine an angle associated with each sonar return. Interferometry may be used in combination with the adaptive beamforming techniques detailed above.

With reference to FIGS. 19-21, the following is an explanation of an example use of interferometry to determine corresponding angles of the sonar returns. Turning to FIG. 19, a simplified example is shown of transducer elements 150, 152 receiving sonar returns A, B from a single point 158 at the floor 156 of a body of water or other reflecting surface to generate a point of return data including a distance and/or time to the point as well as an angle α. During actual interferometric sonar sounding, sonar returns may be received from across the entire beam width of the transmitted sonar pulses to generate a plurality of points of return data in one or more two-dimensional slices. The returns A, B may originate at the same time from the same point 158 and be received by each of the first 150 and second 152 transducer elements.

Each of the transducer elements 150, 152 may produce one-dimensional distance data in response to receiving sonar returns A, B, respectively, from the point 158. The sonar signal processor may combine this one-dimensional distance data from each element with the predetermined distance between the elements and the angle α between the orientation of the transducer elements 150, 152 and a surface of the body of water or other reference point to determine the position of the point 158 of origin of the sonar return. The position of the point 158 may be represented as two-dimensional coordinates with respect to the boat, housing or other reference point, or may alternatively be represented as a distance and angle from the reference point. In yet another embodiment, the position may be determined as an absolute position value by comparing the interferometric data with GPS or other positioning data.

In some embodiments, the location of the point of origin for the sonar returns may be determined via a phase difference between the returns received at the respective transducer elements 150, 152. Turning to FIG. 20, another simplified example of transducer elements 150, 152 receiving sonar returns A, B is shown. In this embodiment, the sonar returns from the point 158 are represented as waves A, B received by the first 150 and second 152 transducer elements. The returns A, B originating from the same point 158 on the floor of the body of water or other reflecting surface may have substantially the same frequency, amplitude, and wavelength. Given that the waves A, B may be expected to have the same properties when received at both the first 150 and second 152 transducer element, a phase difference between the two waves, in combination with the predetermined distance and angle of the transducer array, may provide the location of their point 158 of origin. As shown in FIG. 20, the returns A, B may be received by the respective transducer elements 150, 152 at different positions 160, 162 along the respective waves. The phase, or position, of the wave at the point it is received by the transducer elements may be compared to determine the angle of the point 158 of origin. In some embodiments, the angle (e.g., shown in FIG. 20) may be derived by using an interferometer (e.g., as part of or separate from the sonar signal processor) to calculate a phase difference between the two returns which is converted into a single physical angle, which would be the angle from the seafloor point to the phase center of the array (the imaginary point directly between the two transducer elements being used for the interferometry calculation).

FIG. 21 shows a plot overlaying the returns A, B as received by each transducer element 150, 152 versus time. The phase difference θ between the returns A, B may indicate the degree of offset between the returns, which, when combined with the predetermined distance d, one-dimensional distance data, frequency of the returns, and/or angle of the transducer arrays may produce the position of the point 158 of origin. The angle β to the point 158 may be represented by the following Equation (9):

$$\beta = \arcsin\left(\frac{\lambda\theta}{2\pi d}\right) \quad (9)$$

Where λ represents the wavelength of the return, θ represents the received phase difference, and d represents the predetermined distance.

Though the above explanation focuses on two transducer elements, three or more transducer elements (e.g., transducer elements 150, 152, 154 shown in FIG. 22) may be used with embodiments of the present invention to determine angle information through interferometry.

In some embodiments, the transducer arrays may include more than two transducer elements. For example, FIG. 22 shows the example embodiment of FIG. 19 having three transducer elements 150, 152, 154. Each of the transducer elements 150, 152, 154 may be positioned a predetermined distance $d_1$, $d_2$, $d_3$ from each other. In some embodiments, the distance between elements may differ. In some embodiments, each element may be the same size. In some alternative embodiments, one or more of the elements may differ in size from the remaining elements.

In some further embodiments, the predetermined distance between elements may be minimally-redundant, such that two or more pairs of elements are spaced at a different predetermined distance. For example, in FIG. 22, each predetermined distance $d_1$, $d_2$, $d_3$ may be different, such that $d_1$ is less than $d_2$, which are both less than $d_3$. Alternatively, the spacing between elements may be interchanged (e.g., such that $d_1$ is greater than $d_2$). As detailed below, the minimally-redundant predetermined distances $d_1$, $d_2$, $d_3$ may allow each sub-array (e.g., each pairwise array within the transducer array) to generate a unique solution during the interferometric sounding process. In some alternative embodiments, the elements may be evenly spaced.

In some embodiments, the transducer elements 150, 152, 154 may be used in pairwise sub-arrays to generate more robust return data. For example, in the embodiment shown in FIG. 22, the first 150 and second 152 transducer elements may be used to determine the two dimensional return data of the positions of sonar returns in a manner similar to the two-element embodiments described herein (e.g., using a phase difference between the respective returns). Similarly, the second 152 and third 154 transducer elements may generate the two dimensional return data of the positions of the floor of the body of water or other reflecting surface (e.g., fish, objects, etc.). The first 150 and third 154 elements may also generate the two dimensional return data of the positions of the floor of the body of water or other reflecting surface as detailed herein. Alternatively, any subset of the individual pairs may be used. As detailed below, each of the pairwise sets of return data may then be correlated (e.g., combined, compared, among others) to generate a more robust set of return data.

These elements 150, 152, 154 may be electrified substantially simultaneously to receive the return data, and each of the pairwise comparisons may then be generated from the received data by the sonar signal processor. In some alternative embodiments, each of the pairs (e.g., the first 150 and second 152 elements, the first 150 and third 154 elements, and the second 152 and third 154 elements) may be sequentially electrified to receive sonar returns separately. In some embodiments, the transmitting transducer(s) may be electrified to transmit a sonar pulse and the receiving transducer(s) may be electrified at a predetermined time thereafter to receive the sonar returns from the transmitted pulse. In the sequential embodiments detailed herein, a single sonar pulse may be transmitted for all of the received pairwise returns, or, alternatively, multiple pulses may be transmitted.

Each of the pair-wise array combinations may be defined by the predetermined distance between the respective transducer elements. The acoustic receive sensitivity of each sub-array may vary depending on the predetermined distances between the elements of each array combination. As detailed above, the phase shift with respect to incident angle is related to the predetermined distance between the elements as rewritten in Equation (10):

$$\frac{2\pi}{\lambda} d \sin(\beta) = \theta \qquad (10)$$

Accordingly, the phase shift may vary with incident angle more rapidly for larger d. In some embodiments, a transducer array having multiple transducer elements may arrange the elements according to the minimally-redundant spacing techniques described herein in order to stagger the precision and noise of each sub-array to produce a more robust transducer array. In particular, a "coarse" array may have the smallest predetermined distance d (e.g., the predetermined distance $d_1$ between the leftmost elements 150, 152 of FIG. 22) and thus may be the least sensitive to changes in incident angle and may have the widest phase width. A "medium" array may have a predetermined distance d (e.g., the predetermined distance $d_2$ between the right element 154 and the center element 152 of FIG. 22) that is slightly larger and thus more sensitive to changes in angle. Finally, a "fine" array may have the largest predetermined distance d (e.g., the predetermined distance $d_3$ between the outer two elements 150, 154) and is thus most sensitive to changes in incident angle and has a narrow phase width (e.g., the fine array may phase wrap more frequently).

In the "coarse" array, the pair of elements may receive the least ambiguous data but may also generate the least precise data of the pairwise sub-arrays (e.g., least sensitive to changes in angle). In the "fine" array, the pair of elements may receive somewhat more ambiguous data, but may also generate the most precise data (e.g., most sensitive to changes in angle). In some embodiments, the coarse array produces less ambiguous data because phase wrapping may not occur within a desired range of angles that are ensonified, while the fine array may be more ambiguous because the phase may wrap within the ensonified area. In such embodiments, the coarse array may at least partially resolve the data from the fine array within a specific region, and a single solution may thereby be determined for the fine array.

In embodiments that generate more than one set of interferometric return data (e.g., the "coarse," "medium," and "fine" arrays of FIG. 22), the sets of return data may be correlated in a variety of ways to generate a final set of interferometric return data. In some embodiments, the sets of interferometric return data may be correlated by comparing the sets of data. For example, if three sets of data are used, the sonar signal processor may remove points of return data from one of the sets that substantially differ from the other two (e.g., to eliminate noise). When correlating two or more sets of data, two points that differ substantially between sets may both be removed. In some embodiments, multiple sets of interferometric return data may be correlated (e.g., compared, combined, among others) to generate a more robust set of return data with more data points.

In some embodiments, the results of each set of data may be averaged to produce a final result. For example, the angle determined to a given point by a first set of interferometric return data (e.g., a coarse array) may be averaged with the angle to the same point determined by a second set of interferometric return data (e.g., a fine array) to generate a final angle value. Similarly the distance, time, strength, phase, or component coordinate values may be averaged. In such embodiments, averaging the returns from each of the pairwise arrays may eliminate noise while also generating more precise return data. In some embodiments, weighting can be used for correlating the sets of data to produce the final result (e.g., the fine array may be weighted differently than the coarse array).

As discussed herein, the transmitting transducer (e.g., the transmit transducer 50 shown in FIG. 1B) may transmit one or more sonar pulses downwardly and/or outwardly from the watercraft, and a plurality of transducer elements may receive the corresponding sonar returns in a pairwise fashion to generate interferometric sonar return data. In some embodiments, the interferometric return data may be received from two-dimensional slices of the underwater environment (e.g., beams having a narrow width in the direction of travel of the watercraft—thereby forming thin slices of a raw sonar data of the underwater environment). In this regard, each sonar return of the raw sonar data may be defined by, at least, a distance and an angle (e.g., 2D), which may be processed (e.g., by the sonar signal processor 22 of FIGS. 3-4) to generate 2D sonar data. Further, even though there may be some space within the narrow width of the beam, the 2D sonar returns can be defined to ignore that width and, thus, be assumed to be 2D. The 2D sonar data may be formed as point clouds with a plurality of points representing the returns from a reflecting surface of the body of water (e.g., fish, sea floor, etc.). In some embodiments, the sonar return data from the 2D slice are saved in memory for processing to form a 3D sonar return data, which may be displayed as a 3D image. As detailed below, in some embodiments, the 2D slice may be a planar beam formed by the adaptive beamforming techniques detailed herein. In some embodiments 3D sonar return data representing a 3D image may be stored in a buffer prior to or in conjunction with display on the screen.

Additional embodiments of interferometric systems and 3D imaging systems are detailed in U.S. Provisional Application No. 62/128,635, filed Mar. 5, 2015, and entitled "Systems and Associated Methods for Producing a 3D Sonar Image," which is hereby incorporated by reference herein in its entirety.

Although the embodiments of FIGS. 19, 20, and 22 depict vertically oriented interferometric sub-arrays, interferometry may be performed between any two or more transducer elements. In some embodiments, the transducer elements of a given sub-array are arranged linearly with respect to each other. In some embodiments, the sub-array may be a row or column of a grid of transducer elements. For example, with reference to FIG. 1B, any row $105_A$, $105_B$, $105_C$ ... $105_M$ or column $105_1$, $105_2$, $105_3$ ... $105_N$ of the grid of the array 130 may be processed via interferometry to determine the angle of the sonar returns received in a given plane of the transducer elements. For example, in an embodiment where the rows $105_A$, $105_B$, $105_C$ ... $105_M$ of the grid are oriented substantially horizontally, interferometry may be performed in a substantially vertical plane (e.g., using at least one of columns $105_1$, $105_2$, $105_3$ ... $105_N$) or in a substantially horizontal plane (e.g., using at least one of rows $105_A$, $105_B$, $105_C$ ... $105_M$). Similarly, in an embodiment where an axis connecting the elements in the columns $105_1$, $105_2$, $105_3$ ... $105_N$ are substantially horizontal relative to the surface of the body of water, interferometry may be performed in a substantially horizontal plane (e.g., using at least one of columns $105_1$, $105_2$, $105_3$ ... $105_N$) or in a substantially vertical plane (e.g., using at least one of rows $105_A$, $105_B$, $105_C$ ... $105_M$). As detailed herein, multiple rows or columns may be used to interferometrically process sonar returns from different areas of the underwater environment.

Combined Systems

Some embodiments include N×N or N×M arrays (e.g., transducer array 130 shown in FIG. 1B), which may three-dimensionally image an underwater environment using beamforming, as detailed herein. In some embodiments, multiple sub-arrays of either or both interferometric and beamforming configurations may be used in the transducer array (e.g., the transducer array 130 shown in FIG. 1B) in combination. These combined systems may be used to produce two and three dimensional images of the underwater environment. As discussed above, each of the interferometry and beamforming techniques may resolve a two or three dimensional section of the underwater environment. In some embodiments, both interferometry and beamforming may resolve sonar returns in a plane of the transducer elements in a given sub-array. In some embodiments, as detailed herein, multiple sub-arrays positioned in a respective first and second direction may be used to resolve the position data associated with a set of sonar return data in three dimensions. In some embodiments, the first and second directions may be non-parallel. In some further embodiments, the first and second directions may be substantially perpendicular to each other. The three dimensional position data may be represented as 3D sonar return data and may be further processed to form a 3D image as detailed herein.

In some embodiments, the multiple sub-arrays may be integrated into the same array (e.g., the transducer array 130 shown in FIG. 1B) and may receive sonar pulses from the same transmit transducer. In other embodiments, multiple transmit transducers and/or separate arrays may be used.

In some embodiments, beamforming may be used in a first direction of a transducer array and interferometry may be used in a second direction. For example, with reference to FIG. 1B, the array 130 including the rows $105_A$, $105_B$, $105_C$ ... 105M and columns $105_1$, $105_2$, $105_3$ ... $105_N$ may be used for interferometry in a first direction and for beamforming in a second direction. In some embodiments, two or more of the rows $105_A$, $105_B$, $105_C$ ... $105_M$ may be used in a beamforming configuration such that each row $105_A$, $105_B$, $105_C$ ... $105_M$ using beamforming generates a separate plurality of receive beams (e.g., a first plurality of receive beams and a second plurality of receive beams). Each of the sets of receive beams may substantially overlap to receive sonar returns from the same area of an underwater environment. With reference to FIGS. 7-15, each of the two or more rows using beamforming may generate a plurality of beams 205.

Within each beam, interferometry may be used between the transducer elements of the respective rows to determine the angle of the returns in each beam perpendicular to the forming direction of the rows. In such an embodiment, the rows $105_A$, $105_B$, $105_C$ ... $105_M$ may resolve the position data of the sonar returns in a second direction (e.g., a plane including the longitudinal axis connecting the transducer elements 105 of each respective row) using beamforming, and the elements 105 of each row may resolve the position data of the sonar returns in a first direction (e.g., a plane in the wide width of each respective beam 205, 305) using interferometry. Interferometry may be performed within each beam 205, 305 by correlating the phase data received by the elements in each of the respective rows. In some embodiments, each of the two or more rows $105_A$, $105_B$, $105_C$ ... $105_M$ may function collectively as an interferometer, such that each element 105 forms a portion of a single interferometry element corresponding to one of the rows.

As detailed above, in some embodiments, three or more rows $105_A$, $105_B$, $105_C$ ... $105_M$ may be used. In such embodiments, the rows may include minimally-redundant spacing as detailed above. For example, with continued reference to FIG. 1B, the first row $105_A$ and the second row $105_B$ may be spaced at a first predetermined distance $d_1$, the second row $105_E$ and the fourth row $105_D$ may be spaced at a second predetermined distance $d_2$, and the first row $105_A$ and fourth row $105_D$ may be spaced at a third predetermined distance $d_3$. Within each beamformed beam, "coarse," "medium," and "fine" arrays may be formed from combinations of data from each of the three or more respective rows $105_A$, $105_B$, $105_C$ ... 105M. Based on the returns from each of these "coarse," "medium," and "fine" arrays, a 2D slice of sonar data may be generated for each beamformed beam. When processed with the beamforming data, each of the 2D slices of interferometric sonar data may be combined to generate a 3D image, as detailed below. In some further embodiments, the first predetermined distance $d_1$ may be $2\lambda/3$, where $\lambda$ represents the wavelength of the sonar returns. In some embodiments, the second predetermined distance $d_2$ may be $4\lambda/3$ and may be double the first predetermined distance $d_1$. In some embodiments, the third predetermined distance $d_3$ may be $2\lambda$. In some embodiments, the transducer elements in the beamforming direction (e.g., the elements in a given row) may be redundantly spaced.

In some embodiments, each row (e.g., the rows $105_A$, $105_B$, $105_C$ ... $105_M$ of FIG. 1B) may be approximately 8 inches long and 1 inch tall (e.g., vertically in the direction of the paper of FIG. 1A). Within each row, the transducer elements 105 may be spaced or abutting along a narrow direction of the transducer elements. In such embodiments, the transducer elements may each be approximately one inch long (e.g., corresponding to the height of the row) and less than one inch wide. In some embodiments, as shown in FIG. 1B, the transducer elements 105 may be approximately square or otherwise symmetrical in each direction.

As detailed herein, although some embodiments are described as having a "vertical" or "horizontal" configuration, these terms may be used to depict relative orientations (e.g., horizontal being perpendicular to vertical) rather than absolute planes in the body of water. Any of the embodiments of the transducer arrays detailed herein may be mounted in any of a number of configurations. For example, although the rows $105_A$, $105_B$, $105_C$ ... $105_M$ of FIG. 1B are depicted horizontally on the sheet, they may be positioned horizontally, vertically, diagonally, or in any other configuration in which a planar or curved transducer array 130 may be mounted. By way of example, with reference to FIG. 6, a housing 125 including a transducer assembly (e.g., the transducer assembly 120 shown in FIGS. 1A-1B) is shown mounted on the keel 12 of a water craft 10 and aimed at an angle relative to the surface of the body of water. In such a configuration the rows $105_A$, $105_B$, $105_C$ ... $105_M$ of FIG. 21B may be oriented along the keel 12, perpendicular to the keel, or at a separate, diagonal angle to the keel. In some other embodiments, the transducer assembly may be mounted to the hull of the watercraft or to a separate housing connected to the watercraft as detailed above.

In each embodiment, the transducer array 100 may be oriented such that its emitting surface (e.g., the direction out of the page in FIG. 1B) is aimed in a direction in which the user desires to capture an image and may be rotated about the emitting direction to orient the beamforming and/or interferometric sub-arrays in a desired configuration.

In some embodiments, beamforming may produce a better resolution of the sonar return data than the interferometry data. As detailed above, beamforming may have a greater number of nulls in its beam pattern than an interferometric array because the beamforming sub-arrays may have a greater number of transducer elements. In combined embodiments, the beamforming sub-arrays may be oriented such that at least a component of the longitudinal axis of each sub-array (e.g., the longitudinal axis of the rows $105_A$, $105_B$, $105_C$ ... $105_M$ of FIG. 1B) are oriented parallel to the direction of travel of the vessel to form vertically arranged beams (e.g., as shown in FIG. 14) and the interferometric processing may be performed between the rows in a horizontal direction. In such an embodiment, the beamforming direction of the array may vertically resolve the underwater environment while the interferometric direction of the array may horizontally resolve the underwater environment.

In some alternative embodiments, the beamforming sub-arrays may be oriented such that the longitudinal axis of each sub-array (e.g., the longitudinal axis of the rows $105_A$, $105_B$, $105_C$ ... $105_M$ of FIG. 1B) are oriented perpendicular to the direction of travel of the vessel to form vertical beams (e.g., as shown in FIG. 7) and the interferometric processing may be performed between the rows in a vertical direction. In such an embodiment, the beamforming direction of the array may horizontally resolve the underwater environment while the interferometric direction of the array may vertically resolve the underwater environment.

In some further embodiments, the transducer array (e.g., the transducer array 130 shown in FIG. 1B) may be oriented directly downwardly or in another orientation, as described herein. In a downward orientation, the beamforming sub-arrays may be used parallel to the direction of travel of the watercraft, perpendicular to the direction of travel of the watercraft, at a separate angle to the direction of travel of the watercraft, or may be movable by a user (e.g., on a movable housing, as detailed herein).

As detailed above, some embodiments of the transducer array may use beamforming in two, substantially perpendicular directions. In some alternative embodiments, the transducer array may use interferometry in two, substantially perpendicular directions. In such embodiments, the transducer elements may be spaced and configured as detailed herein, and the transducer elements may further be a symmetrical shape such that the array forms a grid of sonar return data (e.g., as shown in FIG. 1B).

In contrast to existing systems, embodiments of the present invention may transmit a single sonar pulse or a small set of sonar pulses into a wide area of the underwater environment to generate a 3D image of the underwater environment. The transducer elements may receive sonar returns from a single ping and, based on the relative phasing, distance, and/or amplitude of the sonar returns, may process the returns to generate three-dimensional position data as detailed herein. In such embodiments, it is not necessary for the watercraft to be moving to generate the three-dimensional data, nor is it necessary to transmit multiple sonar pulses to different, narrow areas of the underwater environment.

Processing and Display

In some embodiments, as detailed herein, one or more sets of generated beam data associated with one or more respective beams may include position data representing the positions of portions of the underwater environment. The position data in each set of generated beam data may be further processed to define one or more images based upon the position data. For example, a 2D image, defined by 2D image data, may be formed based upon the position data. In some embodiments, a top-down 2D image may be presented to a user showing upcoming underwater features at a predetermined depth. Additionally or alternatively, a side view 2D image may be presented showing the profile of the underwater environment in a predetermined direction (e.g., directly ahead of the watercraft as shown in FIG. 25). In some embodiments, a 3D image may be formed as 3D mesh image data. The 3D mesh image data may be produced by combining the points of position data in each generated beam onto a 3D grid to create a 3D point cloud of individual data points. The position data may be generated as one or more points of data within each generated beam, or alternatively, as determined interferometrically. The 3D point cloud may then be processed (e.g., using the sonar signal processor 22) to generate a 3D mesh based on the overall topography of the point cloud.

For example, in beamforming embodiments, data from one set of planar beams (e.g., planar beams 205 shown in FIG. 7) may be further beamformed in a perpendicular direction to form thin beams that return points of position data, or the data may be formed three dimensionally, as detailed above. Each resulting beam may generate a point of data (e.g., range data) for each time sample. When combined, these points of position data may generate a 3D point cloud of data points. The 3D point cloud may then be processed, as detailed above, to generate a 3D mesh data representing a 3D mesh (e.g., the 3D mesh shown in FIG. 23).

In hybrid beamforming and interferometric embodiments, interferometric position data from 2D slices of the underwater environment corresponding to each formed beam (from the beamforming) may be processed to produce sets of 2D sonar data. In some embodiments, 2D sonar data may be processed with one or more adjacent sets of 2D sonar data to produce an adjusted set of sonar data. The adjusted set of sonar data may include interpolated connections between the points of 2D sonar data and/or between adjacent sets of 2D sonar data to visualize the 2D slices of the underwater environment. The adjusted set of sonar data may represent continuous contours or topographical meshes such that the 3D mesh data may be formed by connecting the adjusted sets of sonar data with connecting gridlines 320, as shown in FIG. 23.

2D sonar data or adjusted 2D sonar data may be grouped and processed into sub-combinations or subsets of data before generating final 3D mesh data for the 3D image. In some embodiments, the 3D mesh data may be stored or displayed in multiple, smaller segments that connect with one another, rather than using a single, large set of 3D mesh data. For example, after a predetermined number of sets of 2D sonar data or after a predetermined memory limit, the 3D mesh data may separate and begin a new segment of 3D mesh data. In some further embodiments, additional or fewer processing steps may be required to convert the raw sonar data into 3D mesh data, and the present disclosure envisions any means of converting raw sonar return data into 3D mesh data.

In some embodiments, the sonar signal processor may be configured to reconstruct objects within the underwater environment (e.g., fish, trees, submerged watercraft, etc.) and use the generated mesh to generate the 3D image data. Additionally or alternatively, only portions of the underwater environment may be reconstructed (e.g., just the bottom surface, or just the bottom surface and fish, etc.). The remaining raw sonar return data could be used to form the remainder of the 3D image data (e.g., using the raw sonar returns or presenting an icon (e.g., fish icon) in place of or over raw sonar returns that have been determined to correspond to an object represented by the icon). U.S. Patent Application Ser. No. 62/128,641, filed Mar. 5, 2015, entitled "Methods and Apparatuses for Reconstructing of a 3D Sonar Image" provides additional detail regarding example systems and methods of reconstructing a 3D image and is hereby incorporated by reference herein in its entirety.

In some embodiments, raw sonar data may be used to form the 3D image data. In some embodiments, a combination of the above noted techniques can be used to form the 3D image data. For example, the bottom surface may be reconstructed and used to generate the 3D image data and the objects within the water column may be updated using the raw sonar data with positioning based on the detected heading.

In some embodiments, the 3D image may be displayed in a perspective view such that the contour of the floor of the body of water is visualized in three dimensions. Additionally, in some embodiments, the 3D image may also be turned with the movement of the boat such that the 3D image appears to turn with the watercraft and/or transducer assembly. In this regard, the display may be north up, boat up, transducer assembly up, or a user-defined direction up.

In any of the embodiments detailed above, a display (e.g., the display 30 of the sonar system 20 shown in FIGS. 3-4) may present one or more sets of data (e.g., depth, sonar, weather, GPS, fish finder, etc.). Combinations of any of the above-referenced sets of data, in addition to chart information, radar, weather, or any other type of information relevant to watercraft, may be presented simultaneously on the display (e.g., via split screen). A user may select any of the possible combinations of display, or a sonar system may update the display based on a desired mode or the characteristics of the boat's motion. For example, the sonar system may automatically add a split-screen view of a downscan sonar image when a boat is idling or an engine is shut off (e.g., when trolling).

In some further embodiments, various sets of data, referred to above, may be superimposed or overlaid onto one another. For example, the 3D image may be applied to a chart information (e.g., a map or navigational chart). Additionally or alternatively, depth information, weather information, radar information, or any other sonar system inputs may be applied to one another. For example, weather or radar information may be added above the boat in the perspective view of the 3D image.

The 3D image may further show terrain features on the bottom of the body of water. For example, with reference to FIG. 23, a hump 328 is shown in the 3D image of the 3D mesh data representing a raised plateau on the bottom of the body of water. In some embodiments, the gridlines 320 may represent squares of connected data points. In some alternative embodiments, the surface may be reconstructed as triangles in order to resolve the surface contour.

In some embodiments, the adjusted sets of sonar data may be rendered and plotted by the sonar system in conjunction with positioning information (e.g., GPS, inertial sensors, dead reckoning positioning, etc.). The positioning information may define a location of the position data generated by the transducer array, which is then used to adjust the position of the sonar data on the display 30 relative to the previous sets of sonar data. In some further embodiments, the positioning information may define an actual geographic position, such that the location and orientation of the sonar data represent an absolute position from which the slice was sounded. In such embodiments, the device may be scaled and oriented onto a chart, to represent a 3D image of the reflected surfaces in the body of water at the same position on the chart.

In some embodiments, the three-dimensional position data may also include objects in the water column, such as the vessel, fish, obstacles, etc. In some alternative embodiments, separate three-dimensional position data may be generated for objects in the water column (e.g., the vessel, fish, obstacles, etc.).

In some embodiments, the 3D mesh data detailed above may be further processed (e.g., by the sonar signal processor 22) to generate a more complex 3D image. The 3D mesh data may be processed to represent a smoother image that may give the user an intuitive understanding of the features of the bottom of the body of water. In some embodiments, the sonar system may apply textures or surfaces to the 3D mesh data to indicate the contour, density, depth, or any other characteristic of the imaged surfaces. For example additional textures or colors may be applied if upcoming features are too shallow for a watercraft to pass over safely.

FIG. 24 illustrates an example 3D image that may be displayed to a user. The 3D image shows the underwater environment 500 from a perspective of a viewer to the upper right of the watercraft 510. The bottom surface 530 of the underwater environment may be displayed and individual raw sonar returns 540 may also be displayed in the water column. A vertical plane 520 may be shown to indicate the current direction of the transducer assembly (though other icons or indicators may be used). Similarly, one or more arcs (not shown) may be displayed to represent the width of the received beams. In other embodiments, the vertical plane 520 may be used as a marker for showing updated 3D sonar image data as it is updated on the screen. In such an embodiment, the vertical plane 520 could instead (or in addition) include a horizontal plane showing the updated 3D sonar image data as it is updated on the screen.

In some further embodiments, 2D images may be generated from the three-dimensional position data. In some embodiments, a top-down 2D image may be presented to a user showing upcoming underwater features at a predetermined depth. Additionally or alternatively, a side view 2D image may be presented showing the profile of the underwater environment in a predetermined direction (e.g., directly ahead of the watercraft).

Example System Hardware

In some embodiments, the transducer assembly (e.g., the transducer assembly 120 shown in FIGS. 3 and 4) may include a housing (e.g., the housing 125 shown in FIG. 6) that may include mounting holes through which screws, rivets, bolts or other mounting devices may be passed in order to fix the housing to a mounting bracket, a device attached to a watercraft or to the hull of the watercraft itself. However, in some cases, the housing may be affixed by welding, adhesive, snap fit or other coupling means. The housing may be mounted to a portion of the vessel, or to a device attached to the vessel, that provides a relatively unobstructed view of both sides of the vessel. Thus, for example, the transducer assembly may be mounted on or near the keel (or centerline) of the vessel (e.g., as shown in FIG. 6), on a fixed or adjustable mounting bracket that extends below a depth of the keel (or centerline) of the vessel, or on a mounting device that is offset from the bow or stern of the vessel (e.g., towfish, trolling motor, etc.). In some embodiments, the sonar module (e.g., the sonar module 18 of FIG. 3) may have one or more components, such as the sonar signal processor 22, positioned within the housing. In some embodiments, the housing may be oriented forward or downward and forward to image an area in front of the watercraft. In some other embodiments the housing may be oriented substantially downwardly to image an area below and/or outwardly to the sides or front of the watercraft. In yet some other embodiments, the housing may be movable, such that a user may orient the housing in a desired direction. The transducer array 100, 130 may include one or more transducer elements 105 positioned within the housing, as described in greater detail herein. In some embodiments, each of the transducer elements may be positioned within the housing so as to point toward a predetermined area under, to the front, or to the side of the watercraft.

The housing (e.g., housing 125 shown in FIG. 6) may include a recessed portion defining containment volume for holding the transducer components. The recessed portion defining the containment volume may extend away from the hull of the vessel on which the housing is mounted and therefore protrude into the water on which the vessel operates (or in which the vessel operates in a case where the transducer assembly is mounted to a tow fish or other submersible device). To prevent cavitation or the production of bubbles due to uneven flow over the housing, the housing (and in particular the containment volume portion of the housing) may have a gradual, rounded or otherwise streamlined profile to permit laminar flow of water over the housing. In some examples, an insulated cable may provide a conduit for wiring (e.g., transmitter circuitry 34 or receiver circuitry 35 shown in FIGS. 3-4) to couple each of the transducer elements (e.g., the transducer elements 105 shown in FIGS. 1A-1B) to the sonar module 18. As detailed herein, any of a number of configurations of transducer elements and transducer arrays may be provided within the housing.

The shape of a transducer element may largely determine the type of beam that is formed when that transducer element transmits a sonar pulse (e.g., a circular transducer element emits a cone-shaped beam, a linear transducer emits a fan-shaped beam, etc.). In some embodiments, a transducer element may comprise one or more transducer elements positioned to form one transducer element. For example, a linear transducer element may comprise two or more rectangular transducer elements aligned with each other so as to be collinear. In some embodiments, three transducer elements aligned in a collinear fashion (e.g., end to end) may define one linear transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Indeed, while depicted and described embodiments generally detail a linear transducer element made of piezoelectric material, other shapes and types of material are applicable to embodiments of the present invention.

In some embodiments, each of the transducer elements (e.g., transducer elements 105 shown in FIGS. 1A-1B) may be a linear transducer element. Thus, for example, each of the transducer elements may be substantially rectangular in shape and made from a piezoelectric material such as a piezoelectric ceramic material, as is well known in the art. As shown in FIGS. 1A-1B, the transducer assembly 120 may include an absorptive material (e.g., a portion of the substrate 115 shown in FIGS. 1A-1B) forming mounting slots that hold the transducer elements 105.

As noted above, any of the transducer elements described herein (e.g., transducer elements 105 shown in FIGS. 1A-1B) may be configured to transmit and receive sonar pulses (e.g., transmit/receive transducer elements). In some embodiments, one or more separate transmit transducers may be provided to ensonify the underwater environment. In such embodiments, the transmit transducer (e.g., the transmit transducer 50 shown in FIG. 1B) may be positioned adjacent the transducer array, within the transducer array, or at a separate position on the watercraft. Although the transmit transducer 50 in FIG. 1B is shown between the rows 105$_D$ and 105$_E$ and columns 1054 and 1055 of the transducer array 130, the transmit transducer may be positioned at any location within the transducer assembly 120 or may be positioned outside of the transducer assembly (e.g., at another point in the housing or on the watercraft). While the transducer elements may be described herein as transmit/receive transducer elements, in some embodiments, the transducer elements may be configured as receive-only transducer elements, or in other cases, transmit-only transducer elements.

In transducer elements that transmit, during transmission of sonar pulses, the piezoelectric material, being disposed in a rectangular arrangement, provides for an approximation of a linear array having beamwidth characteristics that are a function of the length and width of the rectangular face of the transducer elements and the frequency of operation. In an example embodiment, a transducer element may be configured to operate in accordance with at least two operating frequencies. In this regard, for example, a frequency selection capability may be provided by the sonar module 18 to enable the user to select one of at least two frequencies of operation.

It should be noted that although the widths of various beams are shown and described herein, the widths being referred to do not necessarily correspond to actual edges defining limits to where energy is placed in the water. As such, although beams, beam patterns and projections of beam patterns are generally shown and described herein as having fixed and typically geometrically shaped and sharply defined boundaries, those boundaries merely correspond to the −3 dB (or half power) points for the transmitted beams. In other words, energy measured outside of the boundaries shown is less than half of the energy transmitted, but this sound energy is present nonetheless. Thus, some of the boundaries shown are merely theoretical half power point boundaries.

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns. In some embodiments, the transducer assembly 120 may comprise a combination of transducer elements and/or arrays that are configured to transmit sonar pulses and receive sonar returns, transducer elements that are configured to transmit sonar pulses only, and/or transducer elements that are configured to receive sonar returns only.

The active element in a given transducer may comprise at least one crystal. Wires are soldered to these coatings so the crystal can be attached to a cable which transfers the electrical energy from the transmitter to the crystal. As an example, when the frequency of the electrical signal is the same as the mechanical resonant frequency of the crystal, the crystal moves, creating sound waves at that frequency. The shape of the crystal determines both its resonant frequency and shape and angle of the emanated sound beam. Further information regarding creation of sound energy by differently shaped transducer elements may be found in the article "ITC Application Equations for Underwater Sound Transducers", which was published by International Transducer Corporation in 1995, Rev. 8/00, which is hereby incorporated by reference in its entirety.

Frequencies used by sonar devices vary but the most common ones range from 50 KHz to over 900 KHz depending on application. Some sonar systems vary the frequency within each sonar pulse using "chirp" technology. These frequencies are in the ultrasonic sound spectrum and are inaudible to humans.

In an example embodiment, with reference to FIGS. 3-4 the sonar signal processor 22, the transceiver 24, the storage module 26 and/or the communications module 28 may form a sonar module 18. As such, for example, in some cases, the transducer assembly 120 may simply be placed into communication with the sonar module 18, which may itself be a mobile device that may be placed (but not necessarily mounted in a fixed arrangement) in the vessel to permit easy installation of one or more displays 40, each of which may be remotely located from each other and operable independent of each other. In this regard, for example, the communications module 28 may include one or more corresponding interface ports for placing the network in communication with each display 30 in a plug-n-play manner. As such, for example, the communications module 28 may not only include the hardware needed to enable the displays 30 to be plugged into communication with the network via the communications module, but the communications module 28 may also include or otherwise be in communication with software modules for providing information to enable the sonar module 18 to communicate with one or more different instances of the display 30 that may or may not be the same model or type of display and that may display the same or different information. In other words, the sonar module 18 may store configuration settings defining a predefined set of display types with which the sonar module is compatible so that if any of the predefined set of display types are placed into communication with the sonar module 18, the sonar module 18 may operate in a plug-n-play manner with the corresponding display types. Accordingly, the sonar module 18 may include the storage module 26 storing device drivers accessible to the communications module 38 to enable the sonar module 18 to properly work with displays for which the sonar module 18 is compatible. The sonar module 18 may also be enabled to be upgraded with additional device drivers or transceivers to enable expansion of the numbers and types of devices with which the sonar module 18 may be compatible. In some cases, the user may select a display type to check whether a display type is supported and, if the display type is not supported, contact a network entity to request software and/or drivers for enabling support of the corresponding display type.

The sonar signal processor 22 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 22 as described herein. In this regard, the sonar signal processor 22 may be configured to analyze electrical signals communicated thereto by the transceiver 24 to provide sonar data indicative of the size, location, shape, etc. of objects detected by the sonar system 20. For example, the sonar signal processor 22 may be configured to receive sonar return data and process the sonar return data to generate sonar image data for display to a user (e.g., on display 30). Moreover, in some embodiments, the sonar signal processor 22 may be configured to receive additional sonar return data (e.g., downscan or sidescan sonar return data) for processing and generation of sonar image data for display to a user.

In some cases, the sonar signal processor 22 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 22 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with the storage module 26, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 22 may execute commercially available software for controlling the transceiver 24 and/or transducer assembly 120 and for processing data received therefrom.

The transceiver 24 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 24 as described herein. In this regard, for example, the transceiver 24 may include (or be in communication with) circuitry (e.g., transmitter circuitry 34 shown in FIGS. 3-4) for providing one or more transmission electrical signals to the transducer assembly 120 for conversion to sound pressure signals based on the provided electrical signals to be transmitted as a sonar pulse. The transceiver 24 may also include (or be in communication with) circuitry (e.g., receiver circuitry 35 shown in FIGS. 3-4) for receiving one or more electrical signals produced by the transducer assembly 120 responsive to sound pressure signals received at the transducer assembly 120 based on echo or other returns received in response to the transmission of a sonar pulse. The transceiver 24 may be in communication with the sonar signal processor 22 to both receive instructions regarding the transmission of sonar signals and to provide information on sonar returns to the sonar signal processor 22 for analysis and ultimately for driving one or more of the displays 30 based on the sonar returns. In some embodiments, the transmitter circuitry 34 and/or receiver circuitry 35 may be positioned within the transceiver 24 or sonar module 18. In other embodiments the transmitter circuitry 34 and/or receiver circuitry 35 may be positioned within the transducer assembly 120. Likewise, in some embodiments, the transmitter circuitry 34 and/or receiver circuitry 35 may be positioned separate from the transducer assembly 120 and transceiver 24/sonar module 18.

The display 30 may be configured to display images and may include or otherwise be in communication with a user interface 32 configured to receive an input from a user. The display 30 may be, for example, a conventional LCD (liquid crystal display), a touch screen display, mobile device, or any other suitable display known in the art upon which images may be displayed. Although the display 30 of FIG. 3 is shown as being connected to the sonar signal processor 22 via the communications module 38 (e.g., via a network and/or via an Ethernet hub), the display 30 could alternatively be in direct communication with the sonar signal processor 22 in some embodiments, or the display 30, sonar signal processor 22 and user interface 32 could be in a single housing. The user interface 32 may include, for example, a keyboard, keypad, function keys, mouse, scrolling device, input/output ports, touch screen, or any other mechanism by which a user may interface with the system. Moreover, in some cases, the user interface 32 may be a portion of one or more of the displays 30.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for adaptive beamforming, the method comprising:
   receiving, via a transducer array, sonar returns from a sonar pulse transmitted into an underwater environment and converting the sound energy of the sonar returns into sonar return data, wherein the transducer array includes at least two transducer elements;
   generating, via a sonar signal processor, a first beam data associated with a first beam based on the sonar return data, wherein the first beam defines at least one first main lobe oriented in a first direction, the generating comprising:
      forming the sonar return data in the first direction;
      applying a first predetermined window to the sonar return data to define first weighted return data, wherein the first predetermined window is configured to at least partially reduce the sonar return data outside the first direction in the first weighted return data;
      applying a second predetermined window to the sonar return data to define second weighted return data, wherein the second predetermined window is configured to at least partially reduce the sonar return data outside the first direction in the second weighted return data;
      comparing a first power of the first weighted return data to a second power of the second weighted return data; and
      defining, in an instance in which the first power is less than the second power, the first beam data based upon the first weighted return data.

2. The method of claim 1, further comprising:
   generating a second beam data associated with a second beam based on the sonar return data, wherein the second beam defines at least one second main lobe oriented in a second direction, by:
forming the sonar return data in the second direction;
applying a third predetermined window to the sonar return data to define a third weighted return data, wherein the third predetermined window is configured to at least partially reduce the sonar return data outside the second direction in the third weighted return data;
applying a fourth predetermined window to the sonar return data to define a fourth weighted return data, wherein the fourth predetermined window is configured to at least partially reduce the sonar return data outside the second direction in the fourth weighted return data;
comparing a third power of the third weighted return data to a fourth power of the fourth weighted return data;
defining, in an instance in which the third power is less than the fourth power, the second beam data based upon the third weighted return data.

3. The method of claim 2, wherein the first predetermined window is the same as the third predetermined window.

4. The method of claim 2, wherein the first predetermined window is different from the third predetermined window.

5. The method of claim 1, wherein the sonar return data is formed in the first direction for the first beam data by applying a phase shift to the sonar returns received by one or more of the at least two transducer elements to align the sonar returns received by each of the at least two transducer elements in the first direction.

6. The method of claim 1, wherein the first predetermined window defines an average of a first plurality of predetermined windows, wherein the first plurality of predetermined windows includes at least a fifth predetermined window and a sixth predetermined window, wherein generating the first beam data further comprises:
applying the fifth predetermined window to the sonar return data to define a fifth weighted return data, wherein the fifth predetermined window is configured to at least partially reduce the sonar return data outside the first direction in the fifth weighted return data;
applying the sixth predetermined window to the sonar return data to define a sixth weighted return data, wherein the sixth predetermined window is configured to at least partially reduce the sonar return data outside the first direction in the sixth weighted return data;
comparing a fifth power of the fifth weighted return data to a sixth power of the sixth weighted return data; and
wherein, in an instance in which the fifth power is less than the sixth power, defining the first beam data based upon the first weighted return data further comprises defining the first beam data based upon the fifth weighted return data.

7. The method of claim 6, wherein comparing the fifth power of the fifth weighted return data to the sixth power of the sixth weighted return data further comprises comparing the first power of the first weighted return data to the fifth power and the sixth power, such that in an instance in which the fifth power is less than the sixth power and the first power, the first beam data is based upon the fifth weighted return data.

8. The method of claim 6, wherein the second predetermined window defines an average of a second plurality of predetermined windows.

9. The method of claim 6, wherein first plurality of predetermined windows comprises eight predetermined windows, including the fifth predetermined window and the sixth predetermined window.

10. The method of claim 7, wherein the second plurality of predetermined windows comprises eight predetermined windows.

11. The method of claim 1, wherein the first main lobe is symmetric about the first direction.

12. The method of claim 1, wherein the first main lobe is offset from the first direction.

13. The method of claim 1, wherein the first predetermined window comprises unit gain in the first direction.

14. The method of claim 13, wherein the second predetermined window comprises unit gain in the first direction.

15. The method of claim 1, wherein the first beam defines at least one null adjacent the first main lobe.

16. The method of claim 1, further comprising displaying, via a display, an image based upon position data from the first beam data.

17. The method of claim 1, wherein the transducer array defines a first row of transducer elements and a second row of transducer elements;
wherein the first row of transducer elements is configured to generate the first beam data associated with the first beam;
wherein the first row of transducer elements is disposed proximate the second row of transducer elements such that a first transducer element in the first row is positioned in the housing at a predetermined distance from a first transducer element of the second row of transducer elements and a second transducer element of the first row is positioned in the housing at the predetermined distance from a second transducer element of the second row;
wherein the method further comprises:
generating a second beam data associated with a second beam based on the sonar return data received by the second row of transducer elements, wherein the second beam defines at least one second main lobe oriented in the first direction, the generating comprising:
forming the sonar return data received by the second row of transducer elements in the first direction;
applying a third predetermined window to the sonar return data received by the second row of transducer elements to define third weighted return data, wherein the third predetermined window is configured to at least partially reduce the sonar return data outside the first direction in the third weighted return data;
applying a fourth predetermined window to the sonar return data received by the second row of transducer elements to define fourth weighted return data, wherein the fourth predetermined window is configured to at least partially reduce the sonar return data outside the first direction in the fourth weighted return data;
comparing a third power of the third weighted return data to a fourth power of the fourth weighted return data; and
defining, in an instance in which the third power is less than the fourth power, the second beam data based upon the third weighted return data;
generating, based on the sonar return data received by the first row of transducer elements and the second row of transducer elements, a set of 3D sonar return data associated with the underwater environment by:
    generating one or more second angles within at least the first beam by correlating the sonar return data received by the first row of transducer elements and the sonar return data received by the second row of transducer elements in at least the first direction, wherein the correlation is based on the predetermined distance, and wherein the one or more second angles is oriented in a plane spanning the first row and the second row the first direction of first receive beam; and
    generating a 3D image based on the generated set of 3D sonar return data.

18. A sonar system for adaptive beamforming, the system comprising
    a transducer array comprising at least two transducer elements, wherein the transducer array is configured to receive sonar returns from a sonar pulse transmitted into an underwater environment, wherein the transducer elements are configured to convert sound energy of the sonar returns into sonar return data;
    a sonar signal processor configured to generate first beam data associated with a first beam having at least one first main lobe oriented in a first direction, wherein the sonar signal processor is configured to generate the first beam data based on the sonar return data, wherein the sonar signal processor is configured to:
        form the sonar return data in the first direction;
        apply a first predetermined window to the sonar return data to define a first weighted return data, wherein the first predetermined window is configured to at least partially reduce the sonar return data outside the first direction in the first weighted return data;
        apply a second predetermined window to the sonar return data to define a second weighted return data, wherein the second predetermined window is configured to at least partially reduce the sonar return data outside the first direction in the second weighted return data;
        compare a first power of the first weighted return data to a second power of the second weighted return data;
        define, in an instance in which the first power is less than the second power, the first beam data based upon the first weighted return data.

19. The system of claim 18, wherein the sonar signal processor is further configured to generate second beam data associated with a second beam having at least one second main lobe oriented in a second direction, wherein the sonar signal processor is configured to generate the second beam data based on the sonar return data, wherein the sonar signal processor is configured to:
    form the sonar return data in the second direction;
    apply a third predetermined window to the sonar return data to define a third weighted return data, wherein the third predetermined window is configured to at least partially reduce the sonar return data outside the second direction in the third weighted return data;
    apply a fourth predetermined window to the sonar return data to define a fourth weighted return data, wherein the fourth predetermined window is configured to at least partially reduce the sonar return data outside the second direction in the fourth weighted return data;
    compare a third power of the third weighted return data to a fourth power of the fourth weighted return data;
    define, in an instance in which the third power is less than the fourth power, the second beam data based upon the third weighted return data.

20. The system of claim 18, wherein the sonar signal processor is configured to form the sonar return data in the first direction using a phase shift of the sonar returns received by one or more of the at least two transducer to align the sonar returns received by each of the at least two transducer elements in the first direction.

21. The system of claim 20, wherein the first predetermined window is the same as the third predetermined window.

22. The system of claim 20, wherein the first predetermined window is different from the third predetermined window.

23. The system of claim 18, wherein the first predetermined window defines an average of a first plurality of predetermined windows, wherein the first plurality of predetermined windows includes at least a fifth predetermined window and a sixth predetermined window, wherein the sonar signal processor is further configured to:
    apply the fifth predetermined window to the sonar return data to define a fifth weighted return data, wherein the fifth predetermined window is configured to at least partially reduce the sonar return data outside the first direction in the fifth weighted return data;
    apply the sixth predetermined window to the sonar return data to define a sixth weighted return data, wherein the sixth predetermined window is configured to at least partially reduce the sonar return data outside the first direction in the sixth weighted return data;
    compare a fifth power of the fifth weighted return data to a sixth power of the sixth weighted return data; and
    wherein, in an instance in which the fifth power is less than the sixth power, the sonar signal processor is configured to define the first beam data based upon the first weighted return data by being configured to define the first beam data based upon the fifth weighted return data.

24. The system of claim 23, wherein the second predetermined window defines an average of a second plurality of predetermined windows.

25. The system of claim 23, wherein the first plurality of predetermined windows comprises eight predetermined windows, including the fifth predetermined window and the sixth predetermined window.

26. The system of claim 24, wherein the second plurality of predetermined windows comprises eight predetermined windows.

27. The system of claim 18, wherein the first main lobe is symmetric about the first direction.

28. The system of claim 18, wherein the first main lobe is offset from the first direction.

29. The system of claim 18, wherein the first predetermined window comprises unit gain in the first direction.

30. The system of claim 29, wherein the second predetermined window comprises unit gain in the first direction.

31. The system of claim 18, wherein the first beam defines at least one null adjacent the first main lobe.

32. The system of claim 18, further comprising a display configured to display an image based upon position data from the first beam data.

33. The system of claim 18, wherein the transducer array defines a first row of transducer elements and a second row of transducer elements;

wherein the first row of transducer elements is configured to generate the first beam data associated with the first beam;

wherein the first row of transducer elements is disposed proximate the second row of transducer elements such that a first transducer element in the first row is positioned in the housing at a predetermined distance from a first transducer element of the second row of transducer elements and a second transducer element of the first row is positioned in the housing at the predetermined distance from a second transducer element of the second row;

wherein the system is further configured to:
    generate a second beam data associated with a second beam based on the sonar return data received by the second row of transducer elements, wherein the second beam defines at least one second main lobe oriented in the first direction, wherein the system is further configured to:
        form the sonar return data received by the second row of transducer elements in the first direction;
        apply a third predetermined window to the sonar return data received by the second row of transducer elements to define third weighted return data, wherein the third predetermined window is configured to at least partially reduce the sonar return data outside the first direction in the third weighted return data;
        apply a fourth predetermined window to the sonar return data received by the second row of transducer elements to define fourth weighted return data, wherein the fourth predetermined window is configured to at least partially reduce the sonar return data outside the first direction in the fourth weighted return data;
        compare a third power of the third weighted return data to a fourth power of the fourth weighted return data; and
        define, in an instance in which the third power is less than the fourth power, the second beam data based upon the third weighted return data;
    generate, based on the sonar return data received by the first row of transducer elements and the second row of transducer elements, a set of 3D sonar return data associated with the underwater environment, wherein the system is configured to:
        generate one or more second angles within at least the first beam by correlating the sonar return data received by the first row of transducer elements and the sonar return data received by the second row of transducer elements in at least the first direction, wherein the correlation is based on the predetermined distance, and wherein the one or more second angles is oriented in a plane spanning the first row and the second row the first direction of first receive beam; and
    generate a 3D image based on the generated set of 3D sonar return data.

34. A computer program product comprising a non-transitory computer readable storage medium and computer program instructions stored therein, the computer program instructions comprising program instructions configured to:
    receive, via a transducer array, sonar returns from a sonar pulse transmitted into an underwater environment and converting the sound energy of the sonar returns into sonar return data, wherein the transducer array includes at least two transducer elements;
    generate, via a sonar signal processor, first beam data associated with a first beam based on the sonar return data, wherein the first beam defines at least one first main lobe oriented in a first direction, the computer program product further configured to:
        form the sonar return data in the first direction;
        apply a first predetermined window to the sonar return data to define a first weighted return data, wherein the first predetermined window is configured to at least partially reduce the sonar return data outside the first direction in the first weighted return data;
        apply a second predetermined window to the sonar return data to define a second weighted return data, wherein the second predetermined window is configured to at least partially reduce the sonar return data outside the first direction in the second weighted return data;
        compare a first power of the first weighted return data to a second power of the second weighted return data;
        define, in an instance in which the first power is less than the second power, the first beam data based upon the first weighted return data.

35. The computer program product of claim 34, further configured to:
    generate second beam data associated with a second beam based on the sonar return data, wherein the second beam defines at least one second main lobe oriented in a second direction, wherein the computer program product is further configured to:
        form the sonar return data in the second direction;
        apply a third predetermined window to the sonar return data to define a third weighted return data, wherein the third predetermined window is configured to at least partially reduce the sonar return data outside the second direction in the third weighted return data;
        apply a fourth predetermined window to the sonar return data to define a fourth weighted return data, wherein the fourth predetermined window is configured to at least partially reduce the sonar return data outside the second direction in the fourth weighted return data;
        compare a third power of the third weighted return data to a fourth power of the fourth weighted return data;
        define, in an instance in which the third power is less than the fourth power, the second beam data based upon the second weighted return data.

36. The computer program product of claim 34, wherein the sonar return data is configured to be formed in the first direction for the first beam data by applying a phase shift to the sonar returns received by one or more of the at least two transducer elements to align the sonar returns received by each of the at least two transducer elements in the first direction.

37. The computer program product of claim 36, wherein the first predetermined window is the same as the third predetermined window.

38. The computer program product of claim 36, wherein the first predetermined window is different from the third predetermined window.

39. The computer program product of claim 34, wherein the first predetermined window defines an average of a first plurality of predetermined windows, wherein the first plurality of predetermined windows includes at least a fifth predetermined window and a sixth predetermined window, wherein the computer program product is further configured to:

apply the fifth predetermined window to the sonar return data to define a fifth weighted return data, wherein the fifth predetermined window is configured to at least partially reduce the sonar return data outside the first direction in the fifth weighted return data;

apply the sixth predetermined window to the sonar return data to define a sixth weighted return data, wherein the sixth predetermined window is configured to at least partially reduce the sonar return data outside the first direction in the sixth weighted return data;

compare a fifth power of the fifth weighted return data to a sixth power of the sixth weighted return data; and wherein, in an instance in which the fifth power is less than the sixth power, the computer program product is further configured to define the first beam data based upon the first weighted return data by defining the first beam data based upon the fifth weighted return data.

40. The computer program product of claim 39, wherein comparing the fifth power of the fifth weighted return data to the sixth power of the sixth weighted return data further comprises comparing the first power of the first weighted return data to the fifth power and the sixth power, such that in an instance in which the fifth power is less than the sixth power and the first power, the first beam data is based upon the fifth weighted return data.

41. The computer program product of claim 39, wherein the second predetermined window defines an average of a second plurality of predetermined windows.

42. The computer program product of claim 39, wherein first plurality of predetermined windows comprises eight predetermined windows, including the fifth predetermined window and the sixth predetermined window.

43. The computer program product of claim 42, wherein the second plurality of predetermined windows comprises eight predetermined windows.

44. The computer program product of claim 34, wherein the first main lobe is symmetric about the first direction.

45. The computer program product of claim 34, wherein the first main lobe is offset from the first direction.

46. The computer program product of claim 34, wherein the first predetermined window comprises unit gain in the first direction.

47. The computer program product of claim 46, wherein the second predetermined window comprises unit gain in the first direction.

48. The computer program product of claim 34, wherein the first beam defines at least one null adjacent the first main lobe.

49. The computer program product of claim 34, further configured to display, via a display, an image based upon position data from the first beam data.

50. The computer program product of claim 34, wherein the transducer array defines a first row of transducer elements and a second row of transducer elements;

wherein the first row of transducer elements is configured to generate the first beam data associated with the first beam;

wherein the first row of transducer elements is disposed proximate the second row of transducer elements such that a first transducer element in the first row is positioned in the housing at a predetermined distance from a first transducer element of the second row of transducer elements and a second transducer element of the first row is positioned in the housing at the predetermined distance from a second transducer element of the second row;

wherein the computer program product is further configured to:

generate a second beam data associated with a second beam based on the sonar return data received by the second row of transducer elements, wherein the second beam defines at least one second main lobe oriented in the first direction, wherein the computer program product is further configured to:

form the sonar return data received by the second row of transducer elements in the first direction;

apply a third predetermined window to the sonar return data received by the second row of transducer elements to define third weighted return data, wherein the third predetermined window is configured to at least partially reduce the sonar return data outside the first direction in the third weighted return data;

apply a fourth predetermined window to the sonar return data received by the second row of transducer elements to define fourth weighted return data, wherein the fourth predetermined window is configured to at least partially reduce the sonar return data outside the first direction in the fourth weighted return data;

compare a third power of the third weighted return data to a fourth power of the fourth weighted return data; and define, in an instance in which the third power is less than the fourth power, the second beam data based upon the third weighted return data;

generate, based on the sonar return data received by the first row of transducer elements and the second row of transducer elements, a set of 3D sonar return data associated with the underwater environment, wherein the computer program product is configured to:

generate one or more second angles within at least the first beam by correlating the sonar return data received by the first row of transducer elements and the sonar return data received by the second row of transducer elements in at least the first direction, wherein the correlation is based on the predetermined distance, and wherein the one or more second angles is oriented in a plane spanning the first row and the second row the first direction of first receive beam; and generate a 3D image based on the generated set of 3D sonar return data.

* * * * *